(12) United States Patent
Wickel et al.

(10) Patent No.: US 9,765,848 B2
(45) Date of Patent: Sep. 19, 2017

(54) VIBRATION DAMPER ASSEMBLY, IN PARTICULAR FOR THE POWER TRAIN OF A VEHICLE

(71) Applicant: ZF FRIEDRICHSHAFEN AG, Friedrichshafen (DE)

(72) Inventors: Christian Wickel, Wartmannsroth (DE); Matthias Kram, Volkach (DE); Daniel Pittner, Gerbrunn (DE); Peter Hammer, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/766,237

(22) PCT Filed: Feb. 6, 2014

(86) PCT No.: PCT/EP2014/052301
§ 371 (c)(1),
(2) Date: Aug. 6, 2015

(87) PCT Pub. No.: WO2014/122201
PCT Pub. Date: Aug. 14, 2014

(65) Prior Publication Data
US 2015/0369332 A1 Dec. 24, 2015

(30) Foreign Application Priority Data

Feb. 8, 2013 (DE) .................. 10 2013 202 131
Jan. 9, 2014 (EP) ................ PCT/EP2014/050291

(51) Int. Cl.
*F16D 33/18* (2006.01)
*F16F 15/10* (2006.01)
(Continued)

(52) U.S. Cl.
CPC ............... *F16F 15/10* (2013.01); *F16D 3/12* (2013.01); *F16F 15/12366* (2013.01);
(Continued)

(58) Field of Classification Search
CPC .... F16F 15/10; F16F 15/145; F16F 15/12366; F16D 3/12; F16H 45/02; F16H 2045/0221
(Continued)

(56) References Cited

U.S. PATENT DOCUMENTS 9,470,290 B2 * 10/2016 Hoffmann ............. F16F 15/145
464/68.2
2012/0111683 A1 * 5/2012 Ito .......................... F16F 15/145
2016/0160978 A1 * 6/2016 Depraete ................ F16H 45/02
192/3.29

FOREIGN PATENT DOCUMENTS

DE 102008057648 6/2009
DE 102011011469 9/2011

* cited by examiner

*Primary Examiner* — Gregory Binda
(74) *Attorney, Agent, or Firm* — Cozen O'Connor

(57) ABSTRACT

A vibration damping having a first torsional vibration damper couplable to a drive member with a first secondary side rotatable with respect to the first primary side against a return action of a first damper element arrangement, a second torsional vibration damper with a second primary side connected to the first secondary side and with a second secondary side rotatable with respect to the second primary side against the return action of a second damper element arrangement and couplable to an output member, and a deflection mass pendulum arrangement having at least one deflection mass. The first damper element arrangement has a plurality of first damper element units acting parallel to one (Continued)

another and/or the second damper element arrangement has a plurality of second damper element units acting parallel to one another.

6 Claims, 10 Drawing Sheets

(51) Int. Cl.
    *F16F 15/123*     (2006.01)
    *F16F 15/14*     (2006.01)
    *F16H 45/02*     (2006.01)
    *F16D 3/12*     (2006.01)

(52) U.S. Cl.
    CPC ........... *F16F 15/145* (2013.01); *F16H 45/02* (2013.01); *F16H 2045/0221* (2013.01)

(58) Field of Classification Search
    USPC ............ 464/68.2, 68.8, 67.1; 192/3.29, 3.31, 192/201; 74/574.2
    See application file for complete search history.

VIBRATION DAMPER ASSEMBLY, IN PARTICULAR FOR THE POWER TRAIN OF A VEHICLE

PRIORITY CLAIM

This is a U.S. national stage of application No. PCT/EP2014/052301, filed on Feb. 6, 2014. Priority is claimed on the following application: Country: Germany, Application No.: 10 2013 202 131.3, Filed: Feb. 8, 2013 and PCT/EP2014/050291, Filed: Jan. 9, 2014, the content of which is/are incorporated herein by reference in its entirety.

FIELD OF THE INVENTION

The present invention is directed to a vibration damping arrangement, preferably for the drivetrain of a vehicle, comprising a torsional damper arrangement comprising a first torsional vibration damper with a first primary side which is coupled or can be coupled to a drive member for transmitting torque and with a first secondary side which is rotatable around an axis of rotation with respect to the first primary side against the return action of a first damper element arrangement and a second torsional vibration damper with a second primary side connected to the first secondary side and with a second secondary side which is rotatable around an axis of rotation with respect to the second primary side against the return action of a second damper element arrangement and which is coupled or can be coupled to an output member for transmitting torque, and a deflection mass pendulum arrangement comprising a deflection mass carrier and a deflection mass arrangement with at least one deflection mass which is supported at the deflection mass carrier such that it can deflect out of a neutral relative position.

BACKGROUND OF THE INVENTION

A vibration damping arrangement which is integrated in a hydrodynamic torque converter so as to transmit torque between a lockup clutch and an output hub is known from U.S. Pat. No. 8,161,739. The vibration damping arrangement is constructed with a torsional damper arrangement comprising two torsional vibration dampers which act in series with one another and which are substantially radially staggered. A first primary side of a first torsional vibration damper that is positioned farther radially outward is coupled to the output side of the lockup clutch. A secondary side of the second torsional vibration damper which is positioned farther radially inward is connected to the output hub. The first secondary side of the first torsional vibration damper and the second primary side of the second torsional vibration damper together form an intermediate mass arrangement to which the turbine of the hydrodynamic torque converter is fixedly connected on the one hand and to which a deflection mass carrier of a deflection mass pendulum arrangement is fixedly connected on the other hand. A plurality of deflection masses are supported at this deflection mass carrier so as to be distributed in circumferential direction. In the state of rotation, the deflection masses are preloaded radially outward by the centrifugal force and, upon the occurrence of torsional vibrations, move radially inward in centrifugal potential proceeding from a neutral relative position with respect to the deflection mass carrier.

Vibration damping effects, for example, are achieved through the combination of a torsional damper arrangement, particularly one also operating in multiple steps, and a deflection mass pendulum arrangement. The torsional damper arrangement, which may also be referred to generally as a fixed-frequency damper, is tuned to one or possibly more fixedly defined excitation frequencies and is accordingly intended primarily to eliminate vibrational excitations occurring at these known and fixedly predefined frequencies. The deflection mass pendulum arrangement, which can also be referred to generally as a speed-adaptive mass damper, is tuned to one or possibly more excitation orders of an excitation frequency, for example, the ignition frequency, which changes as a function of speed so that the resonant frequency or resonant frequencies of the deflection mass pendulum arrangement vary with speed such that the tuning is substantially maintained within the entire speed spectrum.

It is an object of the present invention to provide a vibration damping arrangement of the type mentioned above with a torsional damper arrangement and a deflection mass pendulum arrangement with improved vibration damping behavior.

SUMMARY OF THE INVENTION

In a vibration damping arrangement, preferably for the drivetrain of a vehicle, comprising a torsional damper arrangement comprising a first torsional vibration damper with a first primary side which is coupled or can be coupled to a drive member for transmitting torque and with a first secondary side which is rotatable around an axis of rotation with respect to the first primary side against the return action of a first damper element arrangement and a second torsional vibration damper with a second primary side connected to the first secondary side and with a second secondary side which is rotatable around an axis of rotation with respect to the second primary side against the return action of a second damper element arrangement and which is coupled or can be coupled to an output member for transmitting torque, and a deflection mass pendulum arrangement comprising a deflection mass carrier and a deflection mass arrangement with at least one deflection mass which is supported at the deflection mass carrier such that it can deflect out of a neutral relative position, the above-stated object is met according to a first aspect of the present invention in that the first damper element arrangement comprises a plurality of circumferentially successive first damper element units acting parallel to one another and/or in that the second damper element arrangement comprises a plurality of circumferentially successive second damper element units acting parallel to one another, and in that a ratio of the quantity of first damper element units and/or of the quantity of second damper element units to the quantity of deflection masses of the deflection mass arrangement is in the range of from 0.6 to 1.7, preferably 0.8 to 1.3.

By providing this ratio in the specified value range, the two system areas contributing to vibration damping and elimination of vibrations are tuned to one another in an optimal manner.

According to a further aspect of the present invention, it can be provided as an alternative to or in addition to the ratio indicated above that a ratio of the stiffness of the first damper element arrangement to the stiffness of the second damper element arrangement is less than 1.2, preferably less than 1.

The stiffness provided in the area of a respective damper element arrangement may be regarded, for example, as the spring constant or total spring constant of the damper element arrangement when the latter is formed with a plurality of damper elements, for example, springs, which are, for example, nested one inside the other or arranged successively in circumferential direction and supported with respect to one another. Particularly when the first torsional vibration damper or damper element arrangement thereof is positioned farther radially outward than the second torsional vibration damper or damper element arrangement thereof, the comparatively large installation space available in the area of the first damper element arrangement can be utilized to install damper elements with comparatively low stiffness so that an appreciable improvement in decoupling quality can be achieved.

According to a further aspect of the present invention, it can be provided as an alternative to or in addition to the ratios indicated above that a ratio of a maximum torque of the first damper element arrangement to a maximum torque of the second damper element arrangement is in the range of from 0.8 to 1.2, preferably 0.9 to 1.1, most preferably about 1, where the maximum torque of a damper element arrangement is a same maximum torque that can be transmitted in the range of the elastic efficiency of the damper element arrangement.

As a result of this configuration of the maximum torques of the two damper element arrangements and the ratio thereof to one another, it is ensured that the two damper element arrangements can transmit substantially the same maximum torque and can therefore operate, for example, in the entire range of torque to be transmitted in the range of their elasticity. It should be noted that the maximum torque of a respective damper element arrangement can be predetermined in that further relative rotation between the primary side and the secondary side of the relevant torsional vibration damper is no longer possible when this maximum torque has been reached, for example, though the agency of a stop.

According to a further aspect of the present invention, it can be provided as an alternative to or in addition to the ratios indicated above that a ratio of a maximum torque of the first damper element arrangement to a maximum driving torque that can be transmitted from a drive unit into the vibration damping arrangement is in the range of from 1.1 to 1.4, preferably 1.15 to 1.35, most preferably 1.2 to 1.22.

Particularly when the first damper element arrangement is provided as the softer, i.e., less stiff, damper element arrangement, it is ensured that the first damper element arrangement can operate in the range of its elasticity in the entire spectrum of torque, i.e., particularly driving torque, that can be delivered in a drive unit.

According to a further aspect of the present invention, it can be provided as an alternative to or in addition to the ratios indicated above that a ratio of a maximum relative rotational angle between the first primary side and the first secondary side proceeding from a neutral relative rotational position of the first primary side with respect to the first secondary side in at least one relative rotational direction, preferably with the torque flow direction from the first primary side to the second secondary side, to a maximum deflection angle of at least one deflection mass from the neutral relative position with respect to the deflection mass carrier is in the range of from 1.3 to 10, preferably in the range of from 1.5 to 7.5.

By providing a ratio of the respective maximum deflection angle, an optimized tuning of the torsional vibration damper arrangement and deflection mass pendulum arrangement to one another is ensured at the same time and, in particular, it is ensured that within the entire operating range of one of the arrangements, the other arrangement can also operate to damp or absorb vibrations.

According to a further aspect of the present invention, it can be provided as an alternative to or in addition to the ratios indicated above that the ratio of a mean friction radius of a clutch arrangement for coupling the first primary side to the drive member to a radial distance of the center of mass of at least one deflection mass from the axis of rotation in the neutral relative position is greater than 0.8, preferably greater than 0.95.

A configuration of this type ensures that particularly in the deflection mass pendulum arrangement, by positioning the at least one deflection mass thereof comparatively farther radially outward, the centrifugal force occurring in rotational operation or the deflection of a deflection mass in centrifugal potential is efficiently utilized.

According to a further aspect of the present invention, it can be provided as an alternative to or in addition to the ratios indicated above that the ratio of a radial distance of the center of mass of the at least one deflection mass from the axis of rotation in the neutral relative position to the outer diameter of a hydrodynamic circuit of a hydrodynamic coupling device, preferably torque converter, containing the vibration damping arrangement is in the range of from 0.3 to 0.5.

Also with this constructional step, an optimal utilization of the available installation space, particularly in radial direction, for the deflection mass pendulum arrangement and accordingly an optimal absorption behavior thereof is achieved.

According to a further aspect of the present invention, it can be provided as an alternative to or in addition to the ratios indicated above that the ratio of an axial width of a hydrodynamic circuit of a hydrodynamic coupling device, preferably torque converter, containing the vibration damping arrangement to the axial width of at least one deflection mass is in the range of from 2.5 to 7.5, preferably 2.75 to 6.9.

When this ratio lies within the indicated value range, it is ensured that when a speed-adaptive mass damper, i.e., a deflection mass pendulum arrangement, is integrated in a hydrodynamic coupling device, sufficient axial installation space is available, or is utilized, for the hydrodynamic circuit thereof.

In order that the torque which is generally to be transmitted in drivetrains of vehicles can be transmitted in the range of the elastic efficiency of the torsional vibration damper arrangement, it is suggested that a stiffness of the first damper element arrangement is in the range of from 10 to 25 Nm/° and/or a stiffness of the second damper element arrangement is in the range of from 10 to 55 Nm/°.

In an embodiment of the torsional vibration damper arrangement, it is suggested that the first damper element arrangement has a substantially constant stiffness in the entire relative rotational angle range of the first primary side with respect to the first secondary side in at least one relative rotational direction, preferably with torque flow direction from the first primary side to the second secondary side, and/or that the second damper element arrangement has a substantially constant stiffness in the entire relative rotational angle range of the second primary side with respect to the second secondary side in at least one relative rotational direction, preferably with torque flow direction from the first primary side to the second secondary side. A configuration of this kind means that at least one of the damper element arrangements is formed substantially in one stage, i.e., with a deflection angle-torque characteristic substantially without a knee or curved area, so that particularly abrupt stiffness transitions are avoided.

In an alternative embodiment, it is suggested that the first damper element arrangement has a stiffness that is dependent on the relative rotational angle of the first primary side with respect to the first secondary side in at least one relative rotational direction, preferably with torque flow from the first primary side to the second secondary side, and/or that the second damper element arrangement has a stiffness that is dependent on the relative rotational angle of the second primary side with respect to the second secondary side in at least one relative rotational direction, preferably with torque flow from the first primary side to the second secondary side. In this way particularly, it can be provided that the stiffness increases with increasing deflection, i.e., as the relative rotational angle increases, in order to ensure greater security against reaching an end stop position.

If a stiffness of this type which changes depending on the relative rotational angle and, therefore, depending on the torque to be transmitted is provided in at least one of the damper element arrangements, then at least one stiffness in the ratio of stiffness of the first damper element arrangement to stiffness of the second damper element arrangement can be a mean stiffness.

To make optimal use of the installation space available, for example, in a hydrodynamic coupling device, it is suggested that the first damper element arrangement comprises a plurality of circumferentially successive first damper element units which operate parallel to one another, that the second damper element arrangement comprises a plurality of circumferentially successive second damper element units which operate parallel to one another, and that the deflection mass arrangement comprises a plurality of circumferentially successive deflection masses.

In so doing, the quantity of first damper element units can correspond to the quantity of second damper element units, and/or the quantity of deflection masses can correspond to the quantity of first damper element units and/or to the quantity of second damper element units. This type of construction is particularly advisable when the first secondary side and/or the second primary side comprises at least one preferably disk-shaped torque transmission element supporting the first damper element units and/or second damper element units, and the deflection mass carrier comprises at least one torque transmission element. This means that the deflection mass pendulum arrangement and deflection mass carrier thereof are structurally integrated in the torsional vibration damper arrangement or an intermediate mass arrangement between the two damper element units thereof. This economizes on installation space. Providing an identical quantity of deflection masses on the one hand and damper element units on the other hand leads to a configuration in which weak points in the torque-transmitting structural component parts are avoided.

It can be provided alternatively or also additionally that the quantity of deflection masses differs from the quantity of first damper element units and/or from the quantity of second damper element units. With a configuration of this type, a greater freedom is achieved in the tuning of the torsional vibration damper arrangement on the one hand and of the deflection mass pendulum arrangement on the other hand to respective exciting frequencies and orders, respectively.

To avoid weak points in torque-transmitting structural component parts in a construction of this type, it is suggested that the first secondary side and/or the second primary side comprises at least one preferably disk-shaped torque transmission element supporting the first damper element units and/or second damper element units, and that the deflection mass carrier is formed separately from the at least one torque transmission element and is connected to the latter.

An embodiment which is favorable with respect to vibration decoupling can be achieved in that an intermediate mass arrangement between the first damper element arrangement and second damper element arrangement comprises the first secondary side, the second primary side and the deflection mass pendulum arrangement.

Embodiment examples relate to a vibration damping arrangement with a supporting component part which serves as a radially outwardly located stop for at least one damper element unit of a radially outwardly located damper element arrangement. The supporting structural component part comprises a free end structure which extends farther in an axial direction than the damper element unit. Accordingly, it can be made possible in some embodiment examples that an area in which the highest stress occurs in the supporting structural component part is not located at an edge of the supporting structural component part or of the free end structure. In this way, wear of the supporting structural component part and/or at the edge thereof could be prevented under some circumstances or at least reduced. Further, by shifting the maximum-stress region away from the edge of the supporting structural component part, the supporting structural component part can also be produced with a smaller thickness, e.g., 2 mm, in some embodiment examples. In some embodiment examples, damper element units or springs which are larger or have a larger diameter can then possibly be used. In some cases, a sheet metal can be used as material. A weight of the supporting structural component part and, therefore, possibly also the weight of the vibration damping arrangement could also be reduced through these steps. In some cases, production of the supporting structural component part can also be facilitated through the arrangement of the free end structure.

In some further embodiment examples, the free end structure adjoins a contact area of the supporting structural component part. A radius can be formed between the end structure and the contact area. By providing the radius between the free end structure and the contact area, the production of the supporting structural component part can be facilitated in some embodiment examples. At least in some operating states, at least one damper element unit can abut in the contact area of the supporting structural component part. For this purpose, for example, the contact area can have, at least at its radially inwardly directed side, a shape which corresponds to a radially outwardly directed shape of the damper element or damper element unit.

Additionally or alternatively, in some embodiment examples the free end structure is formed on at the supporting structural component part in one piece or is formed integral with the supporting structural component part as a sheet metal part. Accordingly, under certain conditions, connecting means could be dispensed with and a desired stress curve could be achieved in the component part.

Additionally or alternatively, the free end structure extends parallel to an axial direction in some embodiment examples. In this way, an installation space could possibly be optimally utilized and, for example, grinding or scraping against other component parts could be prevented. A structural component part extending parallel to an axial direction can deviate from an axial direction in both directions, for example, by a value range with a starting value and/or ending value of 0°, 1°, 4°, 6°, 8° and/or 10°. These deviations can possibly result from manufacturing-related tolerances during the production of the component part, during assembly and/or during an operation.

Embodiment examples relate to a vibration damping arrangement with a radially outwardly located damper element arrangement which is arranged at a disk-shaped structural component part. The vibration damping arrangement also has a supporting structural component part which serves as a radially outer stop for at least one damper element unit of the damper element arrangement. An inner diameter of the supporting structural component part is smaller at one end of the supporting structural component part than an outer diameter of the disk-shaped structural component part. Accordingly, in some embodiment examples it can be possible that the damper element unit can be held better between the supporting structural component part and the disk-shaped structural component part. The free end can be the free end structure which extends farther in an axial direction than the damper element unit. The outer diameter of the disk-shaped structural component part can be, for example, the greatest outer diameter of the disk-shaped structural component part. The inner diameter of the supporting structural component part can possibly be a smallest inner diameter of the supporting structural component part on a side facing the drive proceeding from a center point of the damper element unit in an axial direction.

Embodiment examples relate to a vibration damping arrangement with a radially outwardly located damper element arrangement which is arranged at a disk-shaped structural component part. The vibration damping arrangement also comprises a supporting structural component part which serves as a radially outer stop for at least one damper element unit of the damper element arrangement. The supporting structural component part and the disk-shaped structural component part are connected by a connection structure which is located at a radial height comparable to a center point of the damper element unit. In some embodiment examples, an installation space located radially within the damper element arrangement can possibly be used to receive another damper unit or masses thereof because it is not needed for the connection structure. A comparable radial height may possibly be in an area which extends radially inward and radially outward proceeding from the center point of the damper element unit. The area can have an extension in a value range with a starting value and/or ending value of 0%, 1%, 4%, 5%, 8% and/or 10% of a diameter of the damper element unit, for example.

Embodiment examples are directed to a vibration damping arrangement with a cover disk element which is associated with at least one damper element unit of a radially inwardly located damper element arrangement. The cover disk element has a damper element unit control piece with a free end. Accordingly, it can be possible in some embodiment examples that reduced stresses occur in the cover disk element because these stresses can be reduced through a deliberately permitted deformation of the damper element unit control piece. In other words, unlike conventional cover disk elements, the damper element unit control piece is connected to a radially outwardly located region of the cover disk element. The damper element unit control piece is a structural component part which is or can be in operative connection with or in contact with the at least one damper element unit in circumferential direction.

Embodiment examples are directed to a vibration damping arrangement with a primary side which is or can be coupled to a drive member for transmitting torque and a radially outwardly located secondary side which is rotatable around an axis of rotation with respect to a radially outwardly located primary side against the return action of a radially outwardly located damper element arrangement. The primary side and secondary side are configured to contact one another in axial direction in some operating states in order to prevent or at least reduce the risk that the secondary side touches a housing shell. Thus in some embodiment examples wear between the secondary side and housing shell which could otherwise occur in unfavorable operating states can be prevented. Instead, in some embodiment examples, a contact in axial direction is permitted between the primary side, or a plate constructed as primary side, and the secondary side which execute a smaller relative movement with respect to one another compared to the second secondary side and housing shell when the clutch is open.

Embodiment examples are directed to a hydrodynamic coupling device in which a vibration damping arrangement is connected to a turbine. The connection point between these two structural component parts is located at a radial height comparable to a center point of a damper element unit of a radially inwardly located damper element arrangement. For example, the radially comparable height can be an area extending in each radial direction around the center point of the damper element unit. The area can have an extension, for example, in a value range having a starting value and/or ending value of 0%, 1%, 4%, 5%, 8% and/or 10% of a diameter of the damper element unit. Accordingly, an axial stiffness of the turbine could possibly be increased. In some embodiment examples, a connection structure is provided at the connection point. The connection structure can be guided through apertures in the turbine and vibration damping arrangement, for example, a rivet, a rivet bolt, a screw connection or the like. Further, the connection structure can also be a bonding connection, for example, a weld joint, crimp joint, solder joint, glue joint, or the like.

In some embodiment examples, additionally or alternatively, a stator has a recess which is formed to at least partially accept the connection structure. Accordingly, in some circumstances, sufficient space could be created and/or axial installation space reduced for the connection structure. For example, the connection structure can project from an axial direction into the recess. Additionally or alternatively, the stator can be recessed at a radial height at which the connection structure is situated.

Embodiment examples are directed to a hydrodynamic coupling device with a lockup clutch. A clutch piston of the lockup clutch has a radial extension that is greater than a radius on which a radially outwardly located edge of a deflection mass is located in some operating states. Accordingly, an actuation of the first primary side, which can be constructed as a plate, in order to bring the primary side into contact with the housing can be improved in some embodiment examples. In other words, the clutch piston can be formed in such a way that it extends up to a comparable radial height at which the plate has an area which diverges from the radial direction and which is formed to engage in the damper element arrangement or to contact the latter. For example, the clutch piston can be formed such that its radial extension is greater than a radius on which a radially outwardly located edge of the deflection masses is located in all operating states.

The present invention is further directed to a hydrodynamic coupling device, preferably torque converter, comprising a housing which is or can be filled with fluid, an impeller and a turbine and an output member which is or can be coupled to a transmission arrangement, wherein a vibration damping arrangement which is constructed according to the invention is in the torque transmission path between the housing and the output member.

In a hydrodynamic coupling device of the type mentioned above, the first primary side can be coupled to the housing by means of a lockup clutch arrangement. Alternatively or additionally, the turbine can be fixed with respect to rotation relative to the output member, i.e., can be formed so as to rotate together with the latter around the axis of rotation without the possibility of a relative rotational movement.

The invention is further directed to a drive system for a vehicle comprising a drive unit, a transmission arrangement and a vibration damping arrangement or hydrodynamic coupling device according to the invention in the torque transmission path between the drive unit and the transmission arrangement.

BRIEF DESCRIPTION OF THE DRAWINGS

The invention will be described in detail in the following with reference to the accompanying drawings. The drawings show.

DETAILED DESCRIPTION OF THE PRESENTLY PREFERRED EMBODIMENTS

Figure 1:
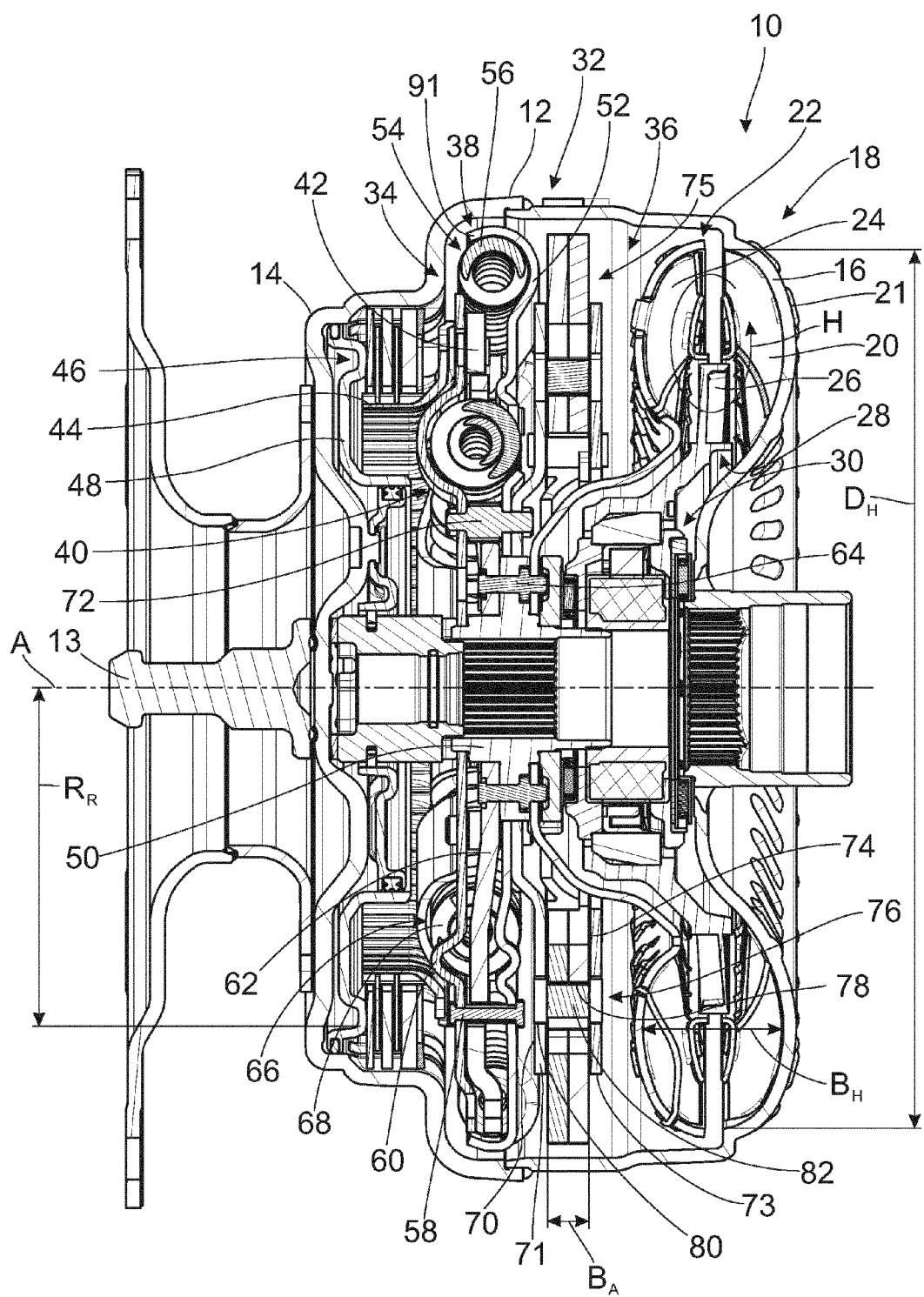
FIG. 1 is a longitudinal sectional view through a hydrodynamic torque converter with a vibration damping arrangement in the torque transmission path between a lockup clutch and an output hub.

In FIG. 1 a hydrodynamic coupling arrangement constructed in this instance as a hydrodynamic torque converter is shown in longitudinal section and designated generally by 10. The torque converter 10 comprises a housing 12 with a drive-side housing shell 14 which can be driven in rotation around an axis of rotation A by a drive shaft 13 acting as drive member and with an output-side housing shell 16. An impeller, designated generally by 18, is formed at the latter. Impeller blades 20 arranged successively in circumferential direction around the axis of rotation A are provided at the inner side of the housing shell 16. To connect the impeller blades 20 or impeller 18 to the housing shell 16, the impeller 18 has one or more tabs 21 protruding from the impeller 18 at one or all of its impeller blades 20. The tabs 21 are guided through recesses, not shown, in the housing shell 16 in a region outside of the housing 12 and bent. In many cases, the tabs 21 are welded to the housing shell 16 to seal the housing shell 16 again in the region of the recesses.

A turbine 22 is provided axially opposite the impeller 18 in the interior of the housing 12. This turbine 22 comprises circumferentially successive turbine blades 24 axially opposite the impeller blades 20. Stator blades 26 of a stator, designated generally by 28, are located axially between the radially inner regions of the impeller blades 20 and turbine blades 24. The stator 28 is supported via a freewheel arrangement 30 on a supporting hollow shaft, not shown, such that it is rotatable in a rotational direction around the axis of rotation A. Through the impeller 18, turbine 22 and stator 28, a hydrodynamic circuit H is developed with the fluid, generally oil, present in the housing 12. This hydrodynamic circuit H can be utilized to transmit or increase torque.

Further, a vibration damping arrangement, designated generally by 32, is provided in the interior of the housing 12. This vibration damping arrangement 32 essentially comprises in axial succession a torsional damper arrangement 34, i.e., essentially a fixed-frequency damper, and a deflection mass pendulum arrangement 36, i.e., essentially a speed-adaptive tuned mass damper.

The torsional damper arrangement 34 comprises two torsional vibration dampers 38, 40 which are radially staggered relative to one another. The first torsional vibration damper 38 which is positioned farther radially outward comprises a first primary side 42 which is constructed, for example, as a central disk element and which can be connected, for example, to an inner plate support 44 of a lockup clutch 46. By means of a clutch piston 48, the output-side inner plates supported at the inner plate support 44 can be brought into frictional engagement with drive-side outer plates which are held at the housing 12 and drive-side housing shell 14 so as to be fixed with respect to relative rotation, and the lockup clutch 46 can therefore be moved into an engaged condition in which a torque can be transmitted directly, i.e., mechanically, between the housing 12 and an output hub 50 acting as output member by bridging the hydrodynamic circuit H.

A first secondary side 52 of the first torsional vibration damper 38 which is positioned farther radially outward comprises two cover disk elements which are positioned on both sides of the first primary side 42. At least one of the latter forms supporting areas for a first damper element arrangement 54 in a radially outer region. This first damper element arrangement 54 comprises a plurality of circumferentially successive first damper element units 56 which are or can be supported with respect to the first primary side 42 on one hand and with respect to the first secondary side 52 on the other hand. Each of these first damper element units 56 can comprise one or more damper elements, i.e., helical compression springs, for example.

In their radially inner area, the two cover disk elements which are fixedly connected to one another, for example, by rivet bolts 58, form a second primary side 60 of the second torsional vibration damper 40 which is positioned farther radially inward. A second secondary side 62 of the second torsional vibration damper 40 is formed, for example, in the manner of a central disk element and, in its radially inner area, is fixedly connected, e.g., by rivet bolts 64, to the output hub 50. The turbine 22 can also be connected together with the second secondary side 62 by rivet bolts 64 or, where applicable, also separately to the output hub 50. A second damper element arrangement 66 of the second torsional vibration damper 40 comprises a plurality of circumferentially successive second damper element units 68. These second damper element units 68 can also comprise one or more damper elements, for example, helical compression springs, which are nested one inside the other or arranged one behind the other in circumferential direction, as the case may be. The second damper element units 68 are supported in circumferential direction at respective supporting regions of the second primary side 60 and second secondary side 62.

In the two torsional vibration dampers 38, 40, the respective primary sides 42, 60 can rotate with respect to the respective secondary sides 52, 62 while generating a return action of the respective damper element arrangements 54, 66 around the axis of rotation A proceeding from a neutral relative rotational position with respect to one another which exists in the torque-free condition. The torque introduced into the housing 12 by a drive unit is transmitted to the output hub 50 and, for example, to a transmission input shaft via the lockup clutch 46, the first primary side 42, the first damper element arrangement 54, the first secondary side 52, the second primary side 60, the second damper element arrangement 66, and the second secondary side 62.

Figure 2:
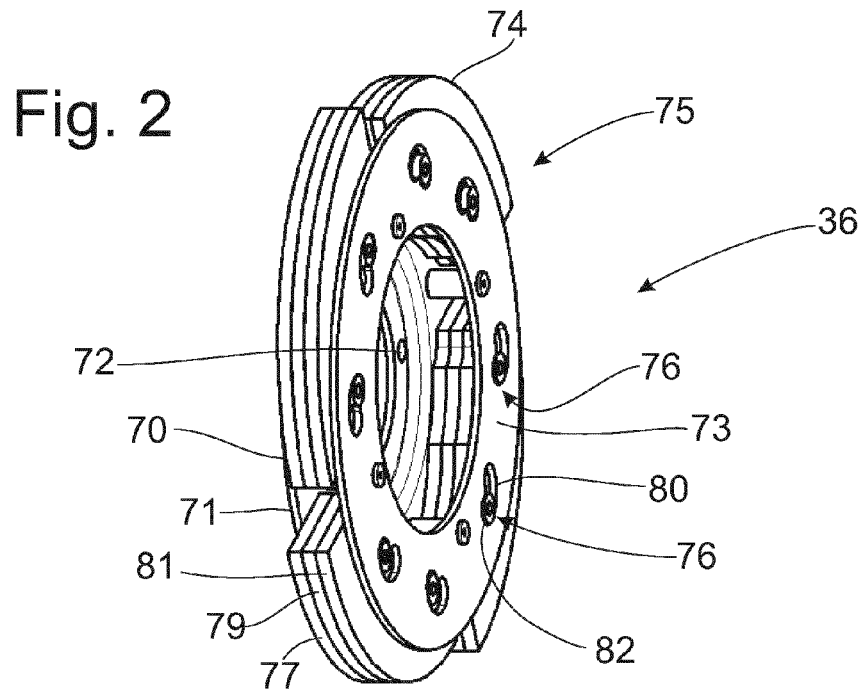
FIG. 2 is a perspective view of a deflection mass pendulum arrangement with deflection masses deflected from a neutral relative position with respect to a deflection mass carrier.

The deflection mass pendulum arrangement 36 shown by itself in FIG. 2 comprises a deflection mass carrier 70 which is shaped like an annular disk, for example. This deflection mass carrier 70 is fixedly connected by rivet bolts 72, for example, in its radially inner region, to the two cover disk elements in the area radially within the second damper element arrangement 66 such that the two cover disk elements providing the first secondary side 52 and the second primary side 60 together with the deflection mass pendulum arrangement 36 essentially provide an intermediate mass arrangement of the two torsional vibration dampers 38, 40.

A plurality of circumferentially successive deflection masses 74 of a deflection mass arrangement 75 are supported at the deflection mass carrier 70. Each of these deflection masses 74 is deflectably supported at the deflection mass carrier 70, for example, in the region of two circumferentially adjacent coupling regions 76. Each of these coupling regions 76 comprises in the deflection mass 74 a curved guide path 78 with radially inwardly located vertex region and, in the deflection mass carrier 70, a curved guide path 80 with radially outwardly located vertex region. A bolt-like coupling element 82 is positioned in such a way that it can be moved, for example, by rolling along guide path 78 in the deflection mass 74 and guide path 80 in the deflection mass carrier 70. It should be noted that the guide path 80 in the deflection mass carrier 70 can comprise a plurality of guide path regions at the deflection masses 74 axially between mutually enclosing disk-shaped structural component parts 71, 73 of the deflection mass carrier 70 and that guide path 78 at a respective deflection mass 74 can comprise a plurality of guide path regions at disk-shaped deflection mass parts 77, 79, 81 which are positioned axially adjacent to one another and provide a deflection mass 74 in each instance.

Through the action of centrifugal force, the deflection masses 74 are acted upon radially outwardly such that, in a neutral relative position of the deflection masses 74 with respect to the deflection mass carrier 70, the guide elements 82 are positioned in each instance in the vertex areas of the curved guide paths 78, 80 which are associated with one another, and the deflection masses 74 occupy their farthest radially outward position. When rotational irregularities or torsional vibrations occur, the deflection masses 74 are accelerated in circumferential direction with respect to the deflection mass carrier 70. In so doing, the guide elements 82 move out of the vertex areas of the guide paths 78, 80 and therefore urge the deflection masses 74 radially inward in centrifugal potential so that they execute an oscillating motion in centrifugal potential. In this way, through the configuration of the masses of the deflection masses 74 on the one hand and the curvature and length of the guide paths 78, 80 on the other hand, a tuning of the resonant oscillating frequency of the deflection masses 74 to an order of excitation can be achieved.

To summarize, a deflection mass pendulum arrangement 36 of this type generally comprises a deflection mass carrier 70 at which at least one deflection mass 74 is supported in at least one coupling region 76 such that it is loaded radially outward by the action of centrifugal force and is urged radially inward when rotational irregularities occur in centrifugal potential. The at least one coupling region can comprise a curved guide path 78 with radially inwardly located vertex region in the at least one deflection mass 74 and/or a curved guide path 80 with radially outwardly located vertex region at the deflection mass carrier 70 and a coupling element 82 which is movable along the guide path or guide paths 78, 80.

It should be mentioned that other constructional variants of deflection mass pendulum arrangements can also be provided in a vibration damping arrangement in principle. For example, a deflection mass pendulum arrangement of this type can comprise at least one deflection mass which is held at a substantially radially extending, flexible and circumferentially deflectable support element constructed, for example, as a wire element or the like, this deflection mass being movable in circumferential direction with respect to a deflection mass carrier accompanied by deformation or deflection of the support element. Depending on centrifugal force, the radial position of a supporting point of the support element with respect to the deflection mass carrier can be varied such that the free and, therefore, deflectable length of the support element can be varied or tuned as speed increases and, accordingly, the resonant oscillating frequency of a deflection mass pendulum arrangement of this type can be increased.

Various configuration parameters which can be provided to optimize the vibration damping behavior in a vibration damping arrangement 32 of this kind which is integrated, for example, in a hydrodynamic torque converter 10 are indicated in the following. It should be noted that the parameters indicated in the following can be provided individually but, in principle, also in any combination.

A first aspect concerns the ratio of the quantity of damper element units 56 of the first damper element arrangement 54 to the quantity of deflection masses 74. This ratio should lie in a range of from 0.6 to 1.7, preferably 0.8 to 1.3, for example. This means that these quantities should not deviate from one another too much. For example, if four damper element units 56 are provided, five deflection masses 74 can be provided, or if five damper element units 56 are provided then four deflection masses 74 can be provided. Also, an equal quantity of each, for example, four of each or five of each, can be suitable in some embodiment examples. As will be seen in the following description, also referring to FIG. 4, these variants are particularly preferred when the deflection mass carrier is integrated in the torsional damper arrangement 34. In a constructional embodiment such as is shown in FIG. 1, i.e., with a basically separate construction of the deflection mass pendulum arrangement 36 and with the deflection mass carrier 70 thereof connected to the torsional damper arrangement, there is a greater freedom with respect to the indicated ratio without the problem of a weakening of components of the torsional damper arrangement.

It is noted that a corresponding ratio can also be realized for the quantity of damper element units 68 of the second damper element arrangement 66 with respect to the quantity of deflection masses 74.

According to a second aspect, a ratio of the stiffness of the first damper element arrangement to the stiffness of the second damper element arrangement is less than 1.2, preferably less than 1. In this case, the stiffness may be regarded, for example, as spring rate, i.e., as the torque to be applied per rotational angle unit for generating a relative rotational movement between a respective primary side and secondary side. In this case, in a respective damper element arrangement 54 or 66, the total stiffness, i.e., the stiffness of all of the damper element units 56 or 68 thereof, is taken into account. For example, the damper element arrangements 54 and 66, respectively, and damper element units 56, 68 thereof are so arranged that they provide a substantially constant stiffness over the entire possible relative rotational angle between a respective primary side and secondary side. Alternatively, the damper element units 56 and 68, respectively, in the first torsional vibration damper 38 and/or second torsional vibration damper 40 could be configured with a stiffness which is dependent upon the relative rotational position of the primary side with respect to the secondary side, particularly with stiffness increasing as the relative rotational angle increases. In this case, the mean stiffness, for example, can be utilized to form the above-mentioned ratio, and, with a step-like change in stiffness, i.e., with a characteristic line having knee regions, the mean stiffness can be calculated by taking the sum of the individual stiffnesses and portions of this sum through the quantity of individual stiffness regions, i.e., by taking the arithmetic mean.

In order that the torques which are generally to be transmitted in motor vehicles can be transmitted in the elastic range of the damper element arrangements 54, 66, the stiffness of the first damper element arrangement 54 can be in the range of from 10 to 25 Nm/°. The stiffness of the second damper element arrangement 66 can be in the range of from 10 to 55 Nm/°. Basically, the first torsional vibration damper 38 should be configured with a stiffness that is less than the stiffness of the second torsional vibration damper 40 which is positioned farther radially inward and is located, for example, in the same axial area as the first torsional vibration damper 38. Accordingly, in the space which is located farther radially outward, the greater volume is utilized to provide a correspondingly large relative rotational angle range between the first primary side 42 and the first secondary side 52 in this space also with less stiffness.

According to a further aspect, it can be provided that the ratio of a maximum torque of the first damper element arrangement 54 to a maximum torque of the second damper element arrangement 66 is in the range of from 0.8 to 1.2, preferably 0.9 to 1.1, most preferably about 1. The maximum torque of a respective damper element arrangement 54, 66 may be regarded as that torque which can be transmitted at a maximum in that range in which the respective primary side and secondary side are twistable relative to one another when the associated damper element arrangement is compressed, i.e., the damper element arrangement is operative in its elastic range. The maximum torque of a respective damper element arrangement can be limited by a rotational stop which prevents further rotation of the respective primary side with respect to the associated secondary side and, therefore, prevents overloading of the damper element arrangement. If the ratio of maximum torques lies in the indicated range, this means that these maximum torques are of approximately equal magnitude so that it is ensured that comparatively large torques, or the largest torques to be transmitted, can be transmitted in the two torsional vibration dampers 38, 40 within the range of their elastic efficiency.

It can further be provided that the ratio of a maximum torque of the first damper element arrangement 54, which is generally configured with less stiffness, to a maximum drive torque that can be delivered by a drive unit is in the range of from 1.1 to 1.4, preferably 1.15 to 1.35, most preferably 1.2 to 1.22. Accordingly, it is ensured at the same time that particularly also the first damper element arrangement 54 which is generally configured to be softer can be elastically efficient within the entire torque spectrum that can be delivered by a drive unit, for example, an internal combustion engine.

Figure 3:
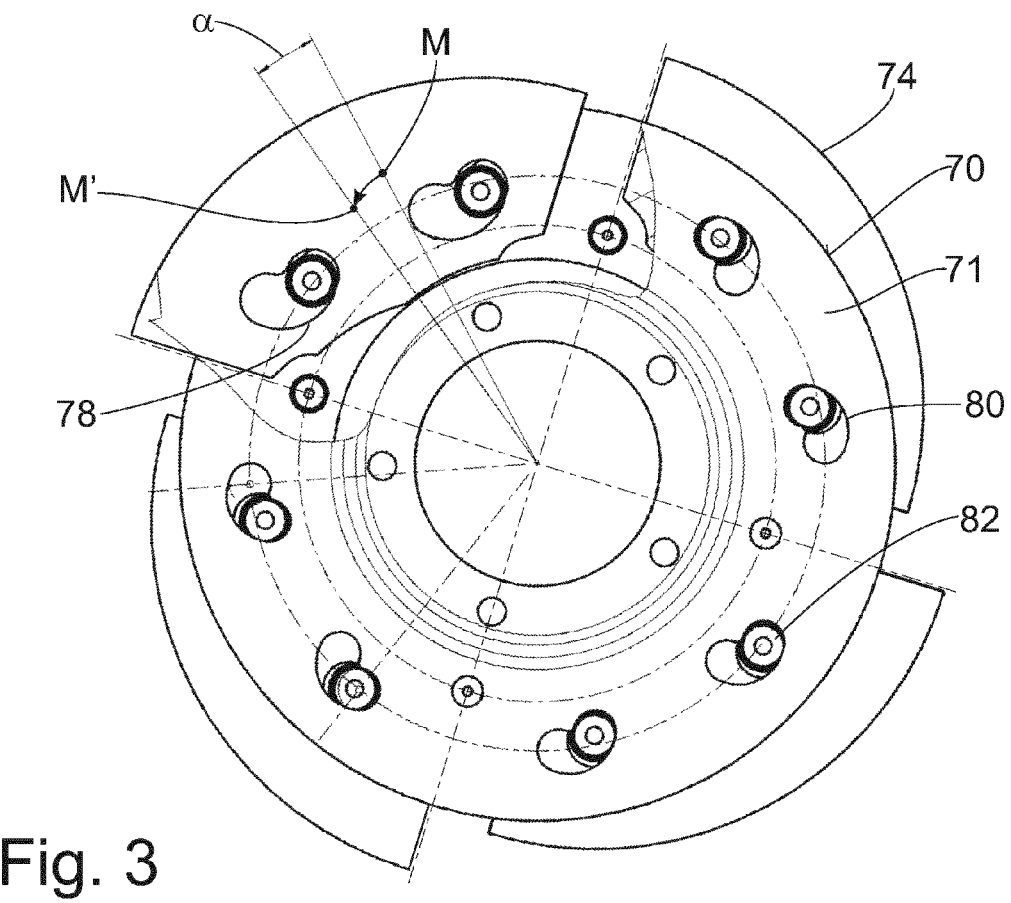
FIG. 3 is an axial view of the deflection mass pendulum arrangement from FIG. 2.

According to a further aspect for optimizing the vibration damping characteristic or vibration absorbing characteristic, it is suggested that a ratio of a maximum relative rotational angle between the first primary side and the first secondary side proceeding from a neutral relative position of the first primary side 42 with respect to the first secondary side 52 in at least one relative rotational direction to a maximum deflection angle α of a deflection mass 74 from the neutral relative rotational position thereof with respect to the deflection mass carrier 70 is in the range of from 1.3 to 10, preferably in the range of from 1.5 to 7.5. The deflection angle α of a deflection mass 74, or of all of the deflection masses 74, is illustrated in FIG. 3. This is the angle that is enclosed between two lines proceeding from the axis of rotation A and traversing the center of mass M of a respective deflection mass 74 in the neutral relative position with respect to the deflection mass carrier or the center of mass M' of all of the respective deflection masses 74 with deflection mass 74 deflected to the maximum extent from the neutral relative position. It will be seen from FIG. 3 that the center of mass M is shifted radially inward during the deflection of a respective deflection mass 74 due to the curved shape of the guide paths 78 and 80, respectively, such that potential energy is absorbed and the deflection masses 74 can execute an oscillation in the range of +/−α around the neutral relative position under the influence of centrifugal force. The maximum deflection can be limited, for example, in that the coupling elements 82 reach the end regions of guide path 78 and/or guide path 80 and continued movement is no longer possible. It has been shown that, of course, depending on the vibration orders to be eliminated or events exciting these vibration orders, the angle α is in a range between 5° and 15°, for example, while the maximum relative rotational angle between the first primary side and the first secondary side 52, also of course depending again on the respective layout of a drivetrain, can range between 20° and 50°, preferably 23° and 45°. Configuring the deflection mass pendulum arrangement 36 in such a way that the maximum deflection angle α is greater than 15° can lead to mutual interference between the deflection masses 74 or to an impairment of the vibration absorbing characteristic, so angle α should not be greater than 15°.

In view of the fact that in this case the pulling state in particular, that is, the state in which a drive unit generates a torque and this torque is to be transmitted via the vibration damping arrangement 32, is an especially critical state, this condition should be realized at least for this pulling state, i.e., a state in which there is a torque flow from the first primary side to the second secondary side 62. Of course, with a symmetrical configuration of the torsional damper arrangement 34, this condition can also be realized for the pushing state, i.e., in a state with torque flow from the second secondary side 62 to the first primary side 42.

According to a further aspect, in order to make the most efficient possible use of the installation space available in a hydrodynamic torque converter 10 in particular, it can be provided that the ratio of a mean friction radius $R_R$ of the lockup clutch 46 to a radial distance $R_M$ of the center of mass M of a respective deflection mass 74 from the axis of rotation in the neutral relative rotational position with respect to the deflection mass carrier 70 is greater than 0.8, preferably greater than 0.95. In this case, for example, the mean radius of the surface area of the drive-side friction elements and output-side friction elements, respectively, in which the latter are frictionally operative in an overlapping manner can be regarded as mean friction radius $R_R$. The arithmetic mean between maximum friction radius and minimum friction radius can also be used in this case. If this ratio is within the specified range, it ensures that the deflection masses are positioned comparatively far radially outward and, accordingly, the centrifugal forces or centrifugal potential occurring in rotational operation are made use of in the most efficient possible manner. In this case, for example, the mean friction radius could range from 91 mm to 93 mm, while the radial distance of the center of mass of the deflection masses 74 from the axis of rotation A can range from 93 mm to 95 mm.

According to a further aspect, it can be provided that the ratio of a radial distance $R_M$ of the center of mass M of the deflection mass 74 or of every deflection mass 74 from the axis of rotation A to the outer diameter $D_H$ of the hydrodynamic circuit of the torque converter 10 is in the range of from 0.3 to 0.5. This means that the center of mass M has approximately the same radial distance from the axis of rotation A as the radially outer regions of the impeller blades 20 or turbine blades 24. This also leads to the most efficient possible utilization of the installation space and of the centrifugal force acting on the deflection masses 74 during rotational operation.

It can further be provided that the ratio of an axial width $B_H$ of the hydrodynamic circuit to the axial width $B_A$ of the deflection mass 74, or of every deflection mass 74, is in a range of from 2.5 to 7.5, preferably 2.75 to 6.9. This means that a comparatively large axial installation space can be used for the hydrodynamic circuit H, but the vibration absorbing effect of a deflection mass pendulum arrangement 36 can also be utilized at the same time.

Figure 4:
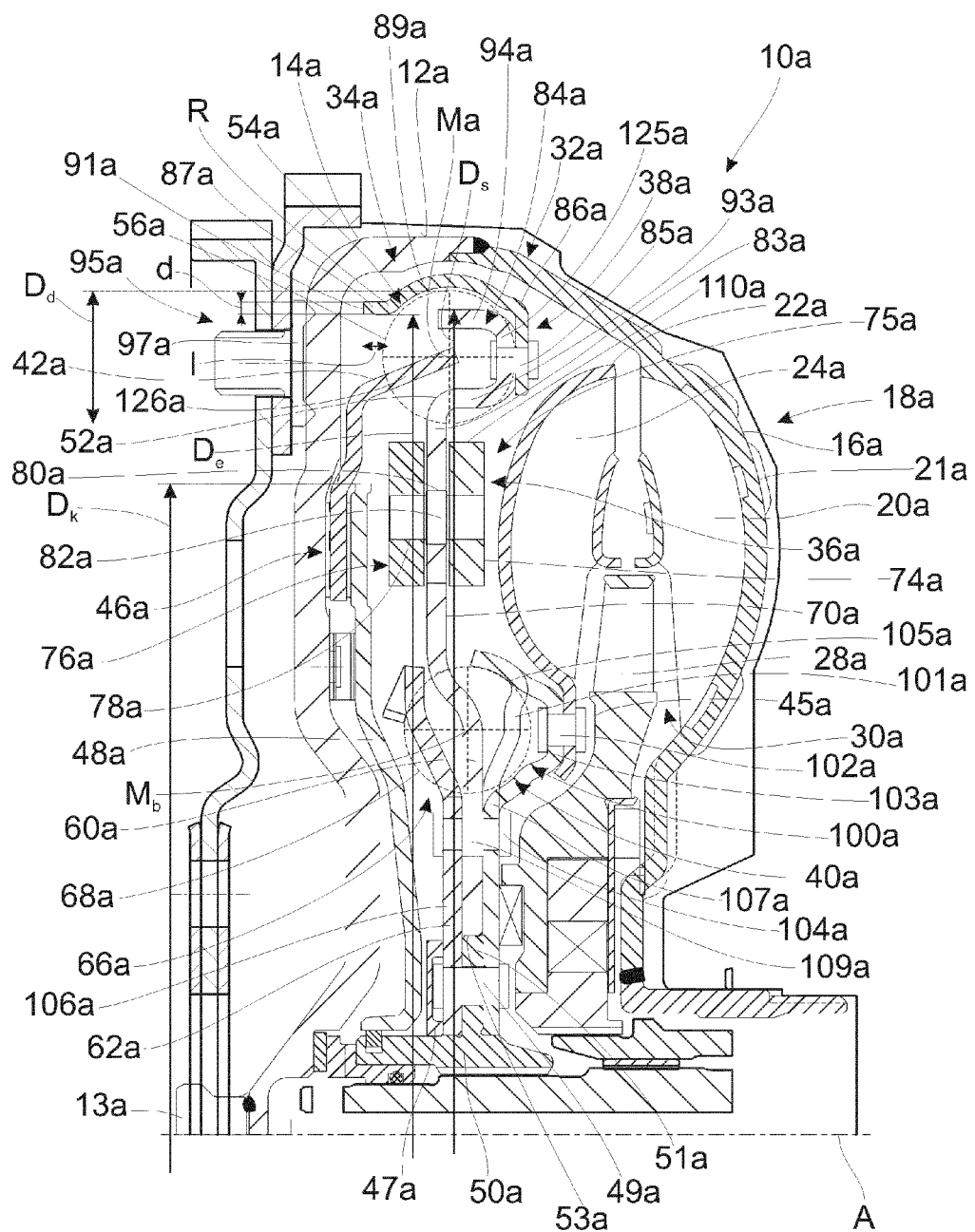
FIG. 4 is a fragmentary longitudinal sectional view through a hydrodynamic torque converter with an alternative construction of the vibration damping arrangement.

Referring to FIG. 4, an alternative embodiment of a hydrodynamic coupling device, again in the form of a hydrodynamic torque converter or vibration damping arrangement contained therein, will be described in the following. Components corresponding to the components described above with respect to construction or function are designated by the same reference numerals to which an "a" is appended. Since the basic construction of the torque converter 10a corresponds to that described in the preceding, only some of the differences, particularly in the region of the vibration damping arrangement 32a, compared to the embodiment form according to FIG. 1 will be addressed in the following. These differences can be implemented individually or in different combinations in further embodiment examples which are not shown.

The torque converter 10a is connected on the drive-side to a drive member, not shown, via a flexible connection plate 95a. The torque converter 10a can be connected to drive components or drive members of different sizes via the flexible connection plate 95a. Varying dimensions of different drive components in axial and/or radial direction can accordingly be compensated if required. Further, the flexible connection plate 95a in some embodiment examples can also serve to keep wobble vibrations, possibly generated by the output member, away from the torque converter 10a. To this end, the flexible connection plate 95a is connected to a drive-side housing shell 14a of the housing 12a in a radially outer region 97a. In a radially inner region, the flexible connection plate 95a is connected to the drive shaft 13a.

In the construction shown in FIG. 4, the torsional damper arrangement 34a again comprises the two radially staggered torsional vibration dampers 38a, 40a which are located substantially in the same axial region. A structural component part which is disk-shaped, for example, and which provides the first primary side 42a and which can also be referred to as plate also forms in its radially inner region a friction element of the lockup clutch 46a which can be pressed by the clutch piston 48a against the inner side of the housing 12a or drive-side housing shell 14a to produce the lockup state. The first secondary side 52a is provided with the disk-shaped structural component part 83a which provides, in its radially outer area, circumferential supporting regions 84a for the damper element units 56a of the first damper element arrangement 54a.

In some embodiment examples, the radially outwardly located damper element arrangement, also referred to as damper, has no end stop in the form of a spacer, sheet-metal tab or the like. Instead, in embodiment examples in which the damper element units are formed as springs or coil springs, a limiting of damper element units or a limiting of spring deflections can be achieved by a so-called winding block. To this end, the spring turns can be blocked, for example, in that they contact one another. To achieve a direct spring stop, the damper element unit which can be formed as a spring block can have flattened turns. The turns can be flattened in a region at which they can abut at an adjacent turn. Accordingly, at least individual turns can have a flat or plane surface directed in circumferential direction.

Figure 5A:
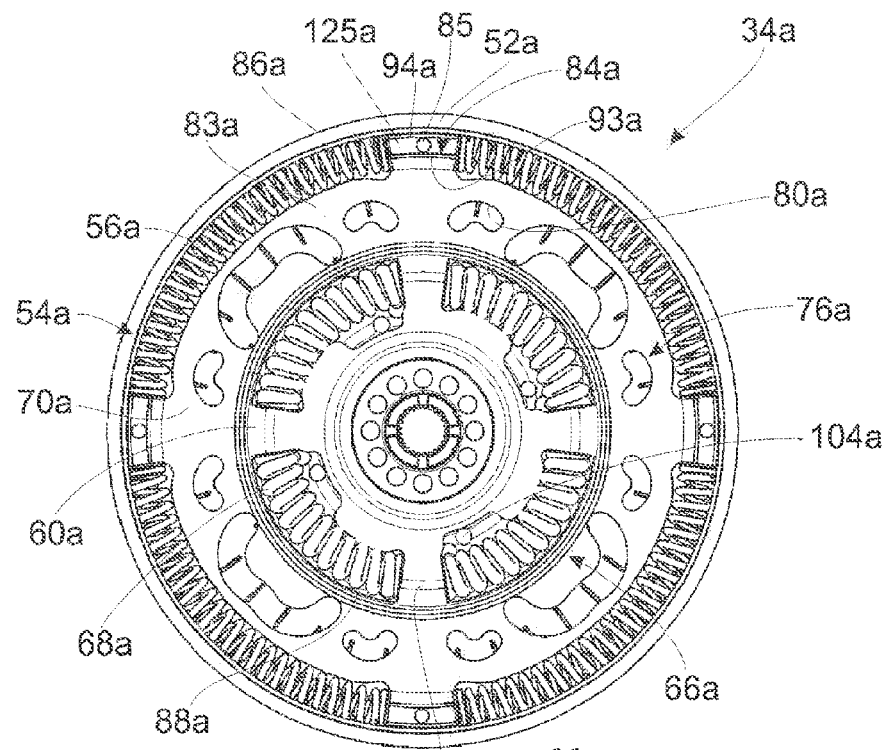
FIG. 5A is an axial view of a torsional vibration damper arrangement for the vibration damping arrangement of the hydrodynamic torque converter from FIG. 4.

An annular supporting structural component part 86a which supports the damper element units 56a radially outwardly can be connected to this disk-shaped structural component part 83a particularly preferably by riveting. A connection structure 85a is used for this purpose. The connection structure 85a is a rivet. As can be seen in FIG. 5A, the disk-shaped structural component part 83a is connected to the supporting structural component part 86a via four connection structures 85a. A connection structure 85a is arranged in each instance at a circumferential supporting region 84a for the damper element units 56a. The circumferential supporting region 84a is C-shaped. A portion 125a which extends substantially in radial direction adjoins a portion 93a of the circumferential supporting region 84a extending substantially in an axial direction toward the turbine 22a. Portion 125a is at a distance in axial direction from a region of the disk-shaped structural component part 83a located farther radially inward. The connection structure 85a is arranged at portion 125a. The C-shaped circumferential supporting region 84a comprises, as third side, a portion 94a which extends substantially parallel to portion 93a in axial direction.

In some further embodiment examples, not shown, the connection structure can also be formed as screw connection, clip connection, embossed connection, weld connection, glue connection or the like. Further, in other embodiment examples which can have a different quantity of circumferential supporting regions, a quantity of connection structures corresponding to the quantity of circumferential supporting regions can be provided. Optionally, the quantity of connection structures can also differ from, possibly be larger or smaller than, the quantity of circumferential supporting regions.

The connection structure 85a is arranged at a height radially comparable to a center point $M_a$ of the damper element unit 56a of the radially outwardly located damper element arrangement 54a. The radially comparable height can lie, for example, in a region that extends in a radial direction from center point $M_a$ and has an extension within a value range having a starting value and/or ending value of 0%, 1%, 4%, 5%, 8% and/or 10% of a diameter $D_d$ of the damper element unit 56a.

The supporting structural component part 86a comprises a contact area 89a at which, in at least one operating state, at least one of the damper element units 56a abuts radially outwardly. In the embodiment example in FIG. 4, the contact area 89a has a radially inwardly directed surface with a curvature. The curvature is formed in a radius which substantially corresponds to a radius of the damper element unit 56a. Further, the supporting structural component part 86a has a free end structure 87a which can also be referred to as a collar. In at least one operating state, the damper element units 56a do not contact the free end structure. The free end structure 87a extends farther in an axial direction than the damper element unit 56a and is oriented substantially parallel to an axial direction. A structural component part extending parallel to an axial direction can deviate in both directions from an axial direction, for example, by an angle lying within a value range with a starting value and/or ending value of 0°, 1 °, 4°, 6°, 8° and/or 10°. An extension of the free end structure 87a in an axial direction, which can also be referred to as collar length l, can be 1 mm, 2 mm or a larger extension.

For example, the supporting structural component part 86a can be formed as a one-piece shaped sheet-metal part. A radius R is formed between the free end structure 87a and the contact area 89a. Radius R can lie within a value range with a starting value and/or ending value of 2 mm, 3 mm, 8 mm, 10 mm, 15 mm and/or 20 mm. In some embodiment examples, radii in a range of 3 mm and 8 mm can be produced in a particularly favorable manner.

By adding the free end structure 87a to the supporting structural component part 86a, which can also be referred to as holding plate, a highest-stress point can be formed at a distance from an edge 91a in some embodiment examples. Accordingly, compared to the embodiment example in FIG. 1 in which the damper element unit 56 can touch the edge 91, wear could be minimized and/or service life could be increased under some circumstances. This may be possible because in some operating states the highest stress in the embodiment example in FIG. 1 occurs at edge 91. Because edges, for example, cut edges, are more susceptible to such stress and can possibly exhibit wear as a result, shifting the highest-stress point or a contact surface of the damper element unit away from the edge can lead in some cases to reduced wear or even to prolonged service life. Further, in some embodiment examples an absolute value of the stress which can occur in the supporting structural component part 86a can be reduced. In some cases, this could also have a beneficial outcome on durability.

As a result of the free end structure 87a and the consequently improved stresses in the structural component part, a material thickness of the supporting structural component part 86a can be reduced in some embodiment examples. The supporting structural component part 86a can possibly be constructed with a thickness d, i.e., a dimension in a radial direction which can also be referred to as plate thickness, of 2 mm.

An outer diameter $D_s$ of the disk-shaped structural component part 83a, which can also be referred to as hub disk, is greater than an inner diameter $D_e$ of the free end structure 87a of the supporting structural component part 86a. The outer diameter $D_s$, which can also be referred to as hub disk diameter, is the greatest diameter of the disk-shaped structural component part 83a at the portion 94a of the circumferential supporting region 84a extending in an axial direction. In some embodiment examples, the damper element units 56a can be better enclosed in this way and cannot exit as easily from a damper element channel or spring channel if the damper element unit is formed as a spring. The damper element channel is at least partially formed between the supporting structural component part 86a and the region 93a of the circumferential supporting region 84 or disk-shaped structural component part 83a extending substantially parallel to the axial direction. Further, a damper element unit actuation or spring actuation could be carried out better because the damper element units 56a or springs can be controlled in an area located farther radially outward. For assembly, the two structural component parts in some embodiment examples cannot be guided together in axial direction because the inner diameter $D_e$ of the supporting structural component part 86a is smaller than the outer diameter $D_s$ of the disk-shaped structural component part 83a. In some embodiment examples, the disk-shaped structural component part 83a can be threaded into the supporting structural component part 86a by tilting.

In some further embodiment examples, the supporting structural component part can be formed without the free end structure. In such cases, the supporting structural component part can have at its open side an inner diameter, also referred to as opening diameter, which is smaller than the outer diameter of the disk-shaped structural component part or hub disk.

In its radially inner area, this disk-shaped structural component part 83a forms the second primary side 60a. It is enclosed on both axial sides by two cover disk elements which provide the second secondary side 62a and which are connected radially inwardly to the output hub 50a, one of the cover disk elements, namely, the one shown at right in FIG. 4, being fixedly connected to the turbine 22a, for example, by riveting. In the embodiment example in FIG. 4, a rivet or rivet bolt is provided as connection structure 102a. To prevent the connection element 102a for connecting the turbine 22a to the secondary side of the vibration damper from touching the stator 28a, there is a corresponding cutout 45a in axial direction.

The turbine 22a is connected to the vibration damping arrangement 32a at a radial height comparable to a center point $M_b$ of the damper element unit 68a of the radially inwardly located damper element arrangement 66a. The radially comparable height can deviate from the center point $M_b$ in a manner analogous to the values already mentioned for radially comparable heights. To this end, the turbine 22a is fastened to cover disk element 100a which covers the damper element units 68a of the radially inwardly located damper element arrangement 66a in axial direction on a side facing the turbine 22a. In other words, the cover disk element 100a has a connection to the turbine shell. A torque of the turbine 22a can run along the left-hand cover disk element 106a in some embodiment examples.

As a result of the above-mentioned steps, the turbine 22a can be connected to a turbine hub or the output hub 50a. A space-saving construction can be made possible in that the turbine 22a is connected to cover disk element 100a next to the damper element units 68a which are possibly formed as springs. The turbine 22a is accordingly connected to the secondary side 62a of the torque converter 10a. Further, as a result of the type of connection described above, an axial stiffness of the turbine 22a can be increased. Accordingly, in different operating states a reduced deformation of the turbine 22a could be made possible because cover disk element 100a has a greater thickness and/or stiffness than the turbine 22a in some embodiment examples.

In addition to or alternatively to the greater material thickness, the stiffness of the cover disk element 100a can also result from the shape of the cover disk element 100a, for example, as a result of a spring window formed therein. The cover disk element 100a has a damper element unit control piece 101a and an outer limiting region 103a at a radial height at which the damper element units 68a are located. For example, the spring window can be formed in axial direction between the damper element unit control piece 101a and the outer limiting region 103a. The connection between the turbine 22a and the cover disk element 100a is carried out at the limiting region 103a. A plurality of connection structures 102a can be provided in circumferential direction. For example, the latter can be arranged in groups and in circumferential direction between two circumferentially adjacent damper element unit control pieces 101a in each instance. The damper element unit control piece 101a, which can also be referred to as spring control piece, and the limiting region 103a are connected again in a contact area 105a radially outside of the spring window or radially outside of an aperture between the damper element unit control piece 101a and limiting region 103a. The damper element unit control piece 101a also again encounters the limiting region 103a at a radially inwardly located contact area 107a. The radially outwardly located contact area 105a is constructed in such a way that it surrounds the damper element units 68a at least partially, but does not overlap a center point $M_b$ of the damper element unit 68a in axial direction.

The cover disk element 100a is connected radially inside the damper element arrangement 66a to a further cover disk element 106a which is associated with the disk-shaped structural component part 83a on a side remote of the turbine 22a. To this end, a connection element 104a is used which penetrates an aperture of cover disk element 100a, an aperture in cover disk element 106a and the spring window 88a in a region radially below the damper element unit 68a of the disk-shaped structural component part 83a. The connection element 104a can likewise be formed as a rivet or rivet bolt. Radially outwardly of the connection element 104a or a connection point, a damper element channel for receiving the damper element units 68a is formed between cover disk elements 100a and 106a in the region of the spring window 88a of the disk-shaped structural component part 83a.

The disk-shaped structural component part 83a is slidingly supported relative to an output hub 50a and relative to a sliding structure 51a projecting from the output hub 50a in radial direction. For example, a sliding bearing 53a can be formed as steel-on-steel contact. Radially inwardly of the sliding bearing 53a, the two cover disk elements 100a and 106a are connected to the output hub 50a or sliding structure 51a which is formed as a continuation of the output hub 50a. For this purpose, a rivet or rivet bolt is used as connection means 49a. In some further embodiment examples, not shown, any other connection means, for example, spacers, spacer bolts, a screw connection, glue connection, clip connection, weld joint, crimp connection or the like can also be used as connection means.

To prevent a clutch piston 48a of the lockup clutch 46a from running against a head of the connection means 49a or against the connection means 49a itself in axial direction, the connection means 49a are covered in axial direction by a protective element 47a. The protective element 47a has a C-shaped cross section. In some cases, the protective element 47a can be formed of a softer material than the clutch piston 48a such as plastic, for example.

The disk-shaped structural component part 83a, particularly the area of the latter between the two damper element arrangements 54a, 66a, forms the deflection mass carrier 70a at which the deflection masses 74a are again supported in the area of two coupling regions 76a, respectively, for carrying out a deflecting movement or pendulum movement. In the example shown in FIG. 4, the deflection masses 74a are formed with, in each instance, two mass parts located on both sides of the disk part 83a. These mass parts can also be fixedly connected to one another, for example.

Due to the fact that connection structure 85a and connection structure 102a, which latter can also be referred to as turbine rivet, are arranged, respectively, in axial direction next to and substantially within a radial extension of the damper element arrangements 66a and 54a, there are no further structural component parts located radially inside along the disk-shaped structural component part 83a.

Some connection elements for connecting individual components or structural component parts in the region of the radially outwardly located damper element arrangements and radially inwardly located damper element arrangements would reduce the installation space, or a space for arranging the deflection masses, located in radial direction between the two damper element arrangements. This is the case, for example, if they are arranged radially outwardly of the radially inner damper element arrangement and/or radially inwardly of the radially outer damper element arrangement, as is the case in some conventional vibration damping arrangements. These conventional connection means, which can be formed as rivets, spacers, spacer bolts or the like, often also require extensive installation space because of the freedom of the disk-shaped structural component part or hub disk in a region of the connection element itself and within a range of the twist angle of the damper element units. The installation space which becomes available in this way can be utilized in other ways in that an additional element connecting the cover disk elements 100a and 106a is omitted radially outside of the damper element arrangement 66a. In this way, the damper element units 56a and/or 68a and/or also the deflection masses 74 can be made larger, for example.

Accordingly, by constructing the vibration damping arrangement 32a according to the embodiment example in FIG. 4 it can be made possible that only the damper element arrangements 54a and 66a and deflection masses 74a, which can also be referred to as speed-adaptive damper weights, are located in an installation space substantially corresponding to a radial and axial extension of the disk-shaped structural component part 83a. Accordingly, a good decoupling behavior can be achieved in some embodiment examples. In other words, the damper element arrangements 54a and 66a and the deflection masses 74a are arranged so as to be radially nested.

The connection elements used in conventional constructions to connect the cover disk elements in a radially outer area are actually intended to absorb forces, for example, expansion forces, of the damper element units 68a in order to reduce the load in the cover disk elements. In order to form the cover disk elements 100a and 106a so as to be sufficiently stiff even without the connection radially outwardly of the damper element unit 68a, the cover disk elements 100a and 106a are stiffened, for example, in axial direction. To this end, the cover disk elements 100a and 106a can have a greater material thickness or sheet metal thickness. Additionally or alternatively, for example, corresponding stamped or embossed structures can be incorporated for stiffening.

Figure 10A:
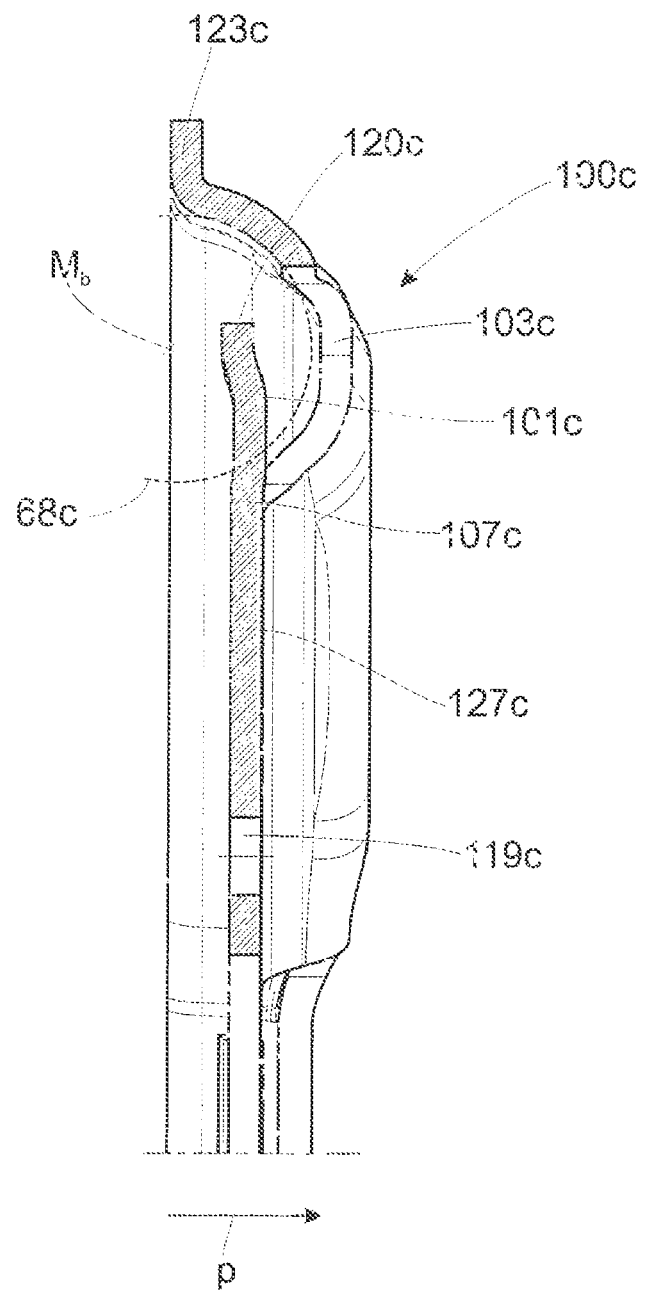
FIG. 10A is a schematical fragmentary longitudinal sectional view through a cover disk element for a hydrodynamic torque converter with a vibration damping arrangement according to an embodiment example.
Figure 10B:
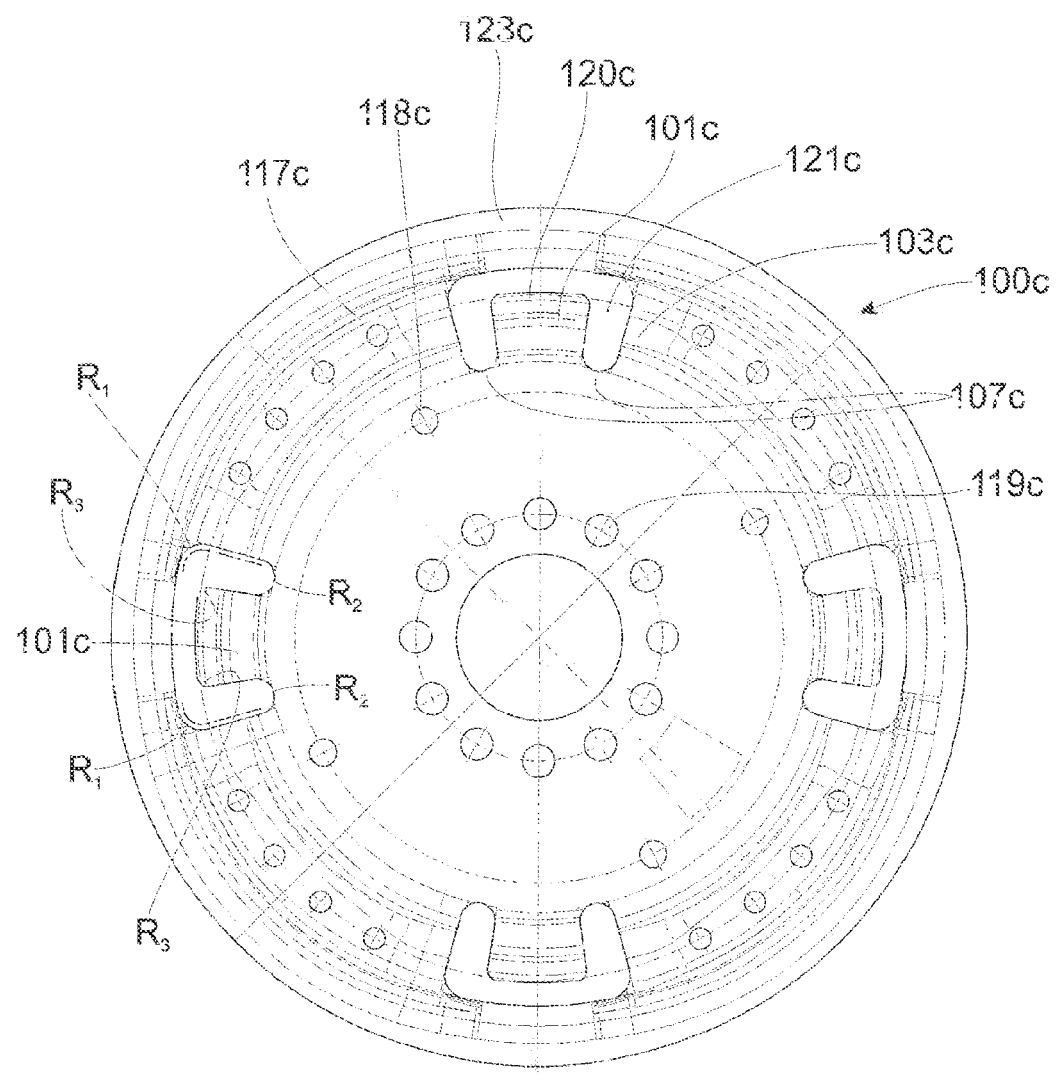
FIG. 10B is a schematical side view of the cover plate from view 10A.

FIGS. 10A and 10B show a further embodiment example for a cover disk element which is suitable for the vibration damping arrangement and an assembly without the radially inwardly located connection means.

FIG. 5A shows an axial view of the torsional damper arrangement 34 considered from the left-hand side in FIG. 4. The disk-shaped structural component part 83a can be seen with its radially outwardly extending support regions 84a at which the damper element units 56a are supported in circumferential direction. In its radially inner region, the structural component part 83a has apertures or spring windows 88a for supporting and receiving the damper element units 68a, which apertures or spring windows 88a are divided in circumferential direction by respective web regions 90a. Also clearly shown are the curved guide paths 80a with radially outwardly located vertex area which are formed in respective coupling regions 76a of the deflection mass carrier 70a which is also provided by the disk-shaped structural component part 83a.

Figure 5B:
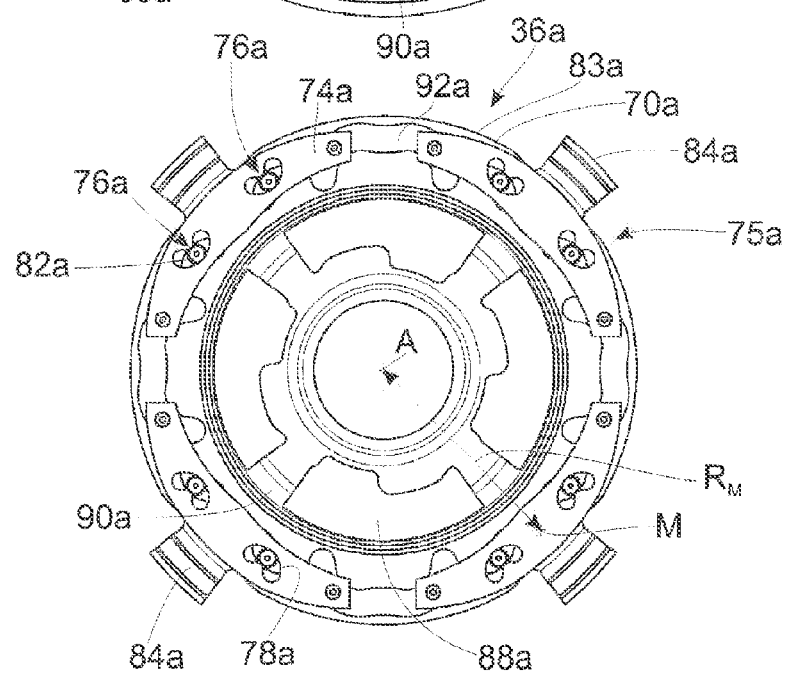
FIG. 5B is an axial view of a deflection mass pendulum arrangement for the vibration damping arrangement of the hydrodynamic torque converter from FIG. 4.

FIG. 5B shows the disk-shaped structural component part 83a, also shown in FIG. 5A, functioning as deflection mass carrier 70a. A total of four deflection masses 74a are shown, each deflection mass 74a being coupled to the deflection mass carrier 70a at two circumferentially spaced coupling regions 76a by a coupling element 82a positioned at this location. The curved guide paths 78a with radially inwardly located vertex region which are formed in the deflection masses 74a or in the two portions of a respective deflection mass 74a are also shown in FIG. 5B. FIG. 5B also shows apertures 92a in the disk-shaped structural component part 83a which are associated with the respective circumferential end regions of the deflection masses 74a. Elements, for example, rivet bolts or the like, connecting the two parts of a respective deflection mass 74a extend through these apertures 92a.

It will be seen from FIGS. 5A and B that in this type of construction or layout of torsional damper arrangement 34a on the one hand and of deflection mass pendulum arrangement 36a on the other hand, every torsional vibration damper 38a, 40a has four circumferentially successive damper element units 56a, 68a which, for example, are located in each instance in circumferential regions which are associated with one another, i.e., identical circumferential regions, such that the supporting regions 84a substantially extend the web regions 90a between the apertures 88a in radial direction, i.e., essentially have no circumferential offset with respect to the latter. In other words, in the embodiment example shown in FIGS. 5A and B, the web region 90a and a supporting region or circumferential supporting region 84a, which can also be referred to as web, are formed so as to be aligned with one another without angular offset. Also provided in the region of the deflection mass pendulum arrangement 36a is a total of four deflection masses 74a which are positioned in circumferential direction in such a way that they are centered in circumferential direction with respect to a respective supporting region 84a or web region 90a. As a result, the apertures to be produced for a respective coupling region 76a in the deflection mass carrier 70a for providing the curved guide paths 80a are located on both sides of the supporting regions 84a or web regions 90a so as to prevent a material weakening in the disk-shaped structural component part 83a, particularly where torque is introduced into or transmitted from the damper element units 56a, 68a. This means that, because of a positioning that prevents weakening and owing to the identical quantity of damper element units on the one hand and deflection masses on the other hand, it is also possible to transmit high torques in spite of the structural integration of the deflection mass carrier 70a in a structural component part which also simultaneously has a torque transmitting functionality in the torsional damper arrangement 34a.

Figure 6A:
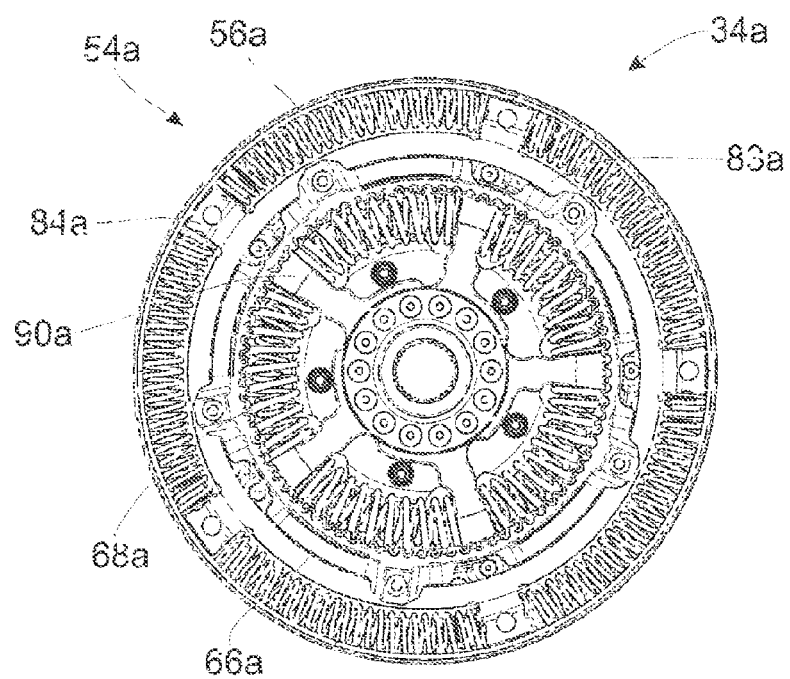
FIG. 6A is an axial view of a torsional vibration damper arrangement for the vibration damping arrangement of the hydrodynamic torque converter from FIG. 4.
Figure 6B:
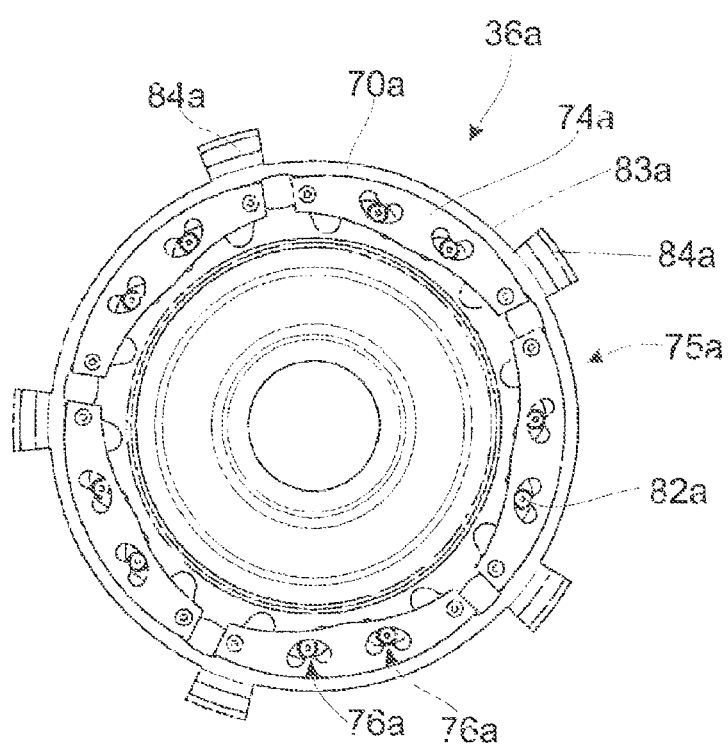
FIG. 6B is an axial view of a deflection mass pendulum arrangement for the vibration damping arrangement of the hydrodynamic torque converter from FIG. 4.

In a manner corresponding to FIGS. 5A and B, FIGS. 6A and 6B show a construction which is based on the same constructional principle, but with a different distribution in the region of the damper element units 56a, 68a on the one hand and deflection masses 74a on the other hand. It will be seen that there is a total of five first damper element units 56a and five second damper element units 68a which are arranged, respectively, in substantially the same radial area as the first damper element units 56a. Accordingly, in this case also, the supporting regions 84a substantially extend the web regions 90a in radial direction. In a corresponding manner, FIG. 6B shows a total of five circumferentially successive deflection masses 74a which, however, are now positioned in circumferential direction in such a way that they lie approximately in the middle between two circumferentially successive supporting regions 84a of the disk-shaped structural component part 83a. Accordingly in this case, as in the constructional type shown in FIGS. 5A and B, there is a ratio of 1 between the quantity of first damper element units 56a and the quantity of second damper element units 68a in proportion to the quantity of deflection masses 74a.

Figure 7A:
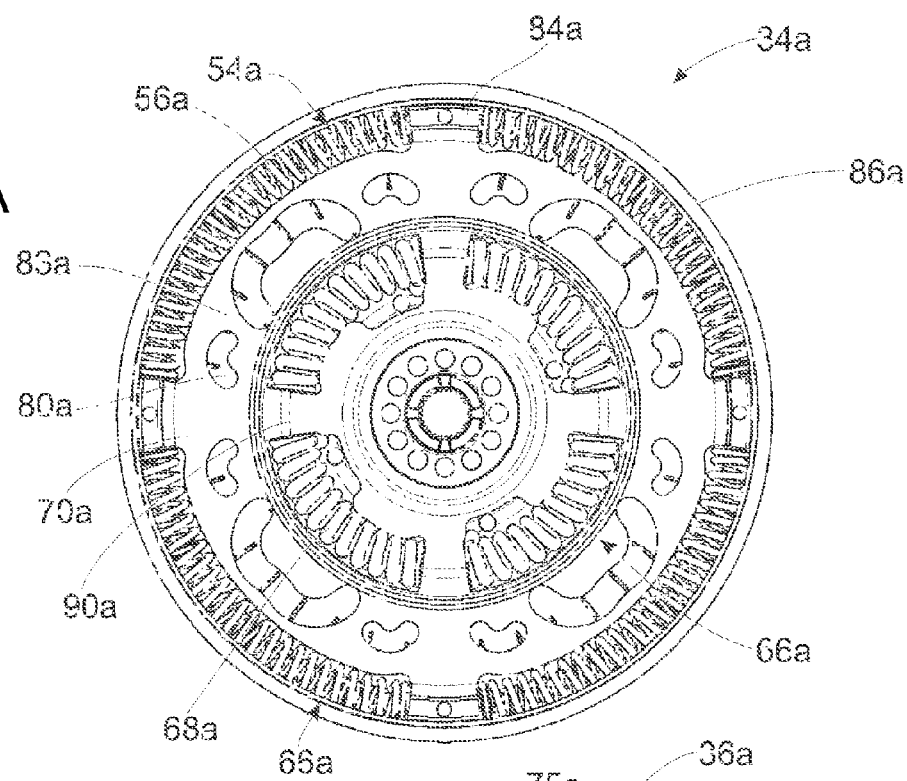
FIG. 7A is an axial view of a torsional vibration damper arrangement for the vibration damping arrangement of the hydrodynamic torque converter from FIG. 4.
Figure 7B:
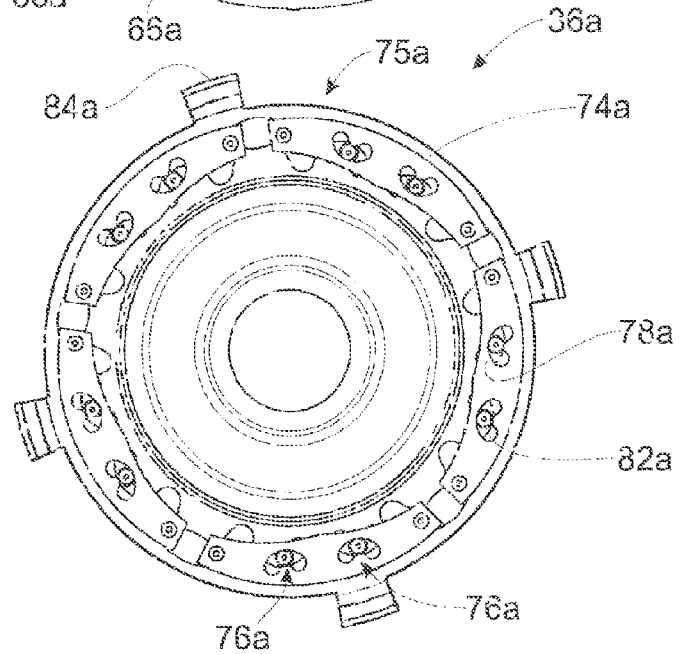
FIG. 7B is an axial view of a deflection mass pendulum arrangement for the vibration damping arrangement of the hydrodynamic torque converter from FIG. 4.

Proceeding again from the construction of the vibration damping arrangement 32a shown in FIG. 4, FIG. 7A shows the construction of the torsional damper arrangement 34a with four first damper element units 56a and four second damper element units 68a as has also already been described with reference to FIG. 5A. This torsional damper arrangement 34a is combined with a deflection mass pendulum arrangement 36a with a total of five circumferentially successive deflection masses 74a, i.e., with a construction such as that which has already been described referring to FIG. 6B. In this case, the ratio of the quantity of first damper element units 56a and second damper element units 68a, respectively, to the quantity of deflection masses 74a is 0.8.

Figure 8A:
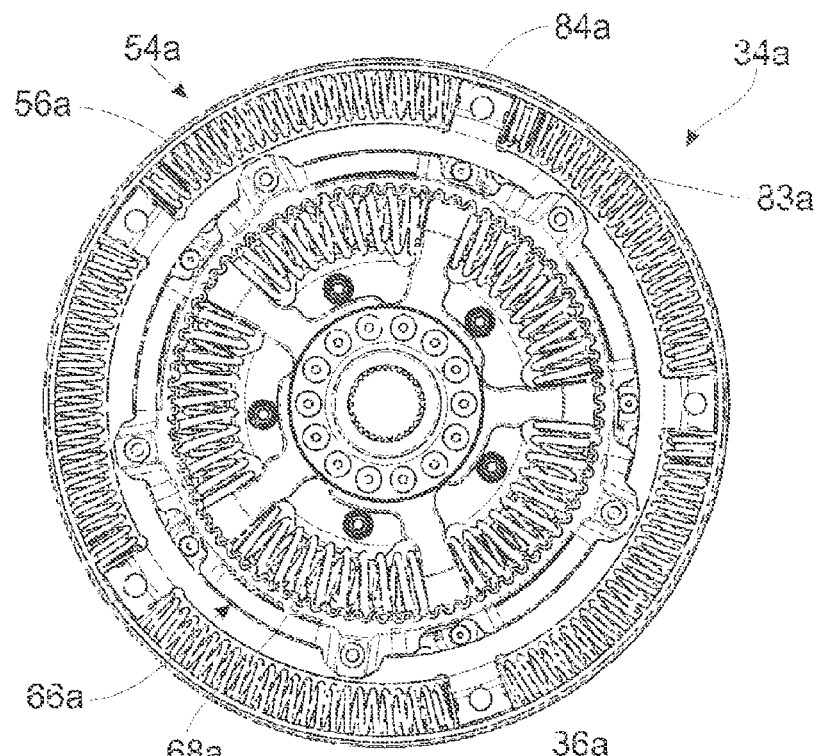
FIG. 8A is an axial view of a torsional vibration damper arrangement for the vibration damping arrangement of the hydrodynamic torque converter from FIG. 4.
Figure 8B:
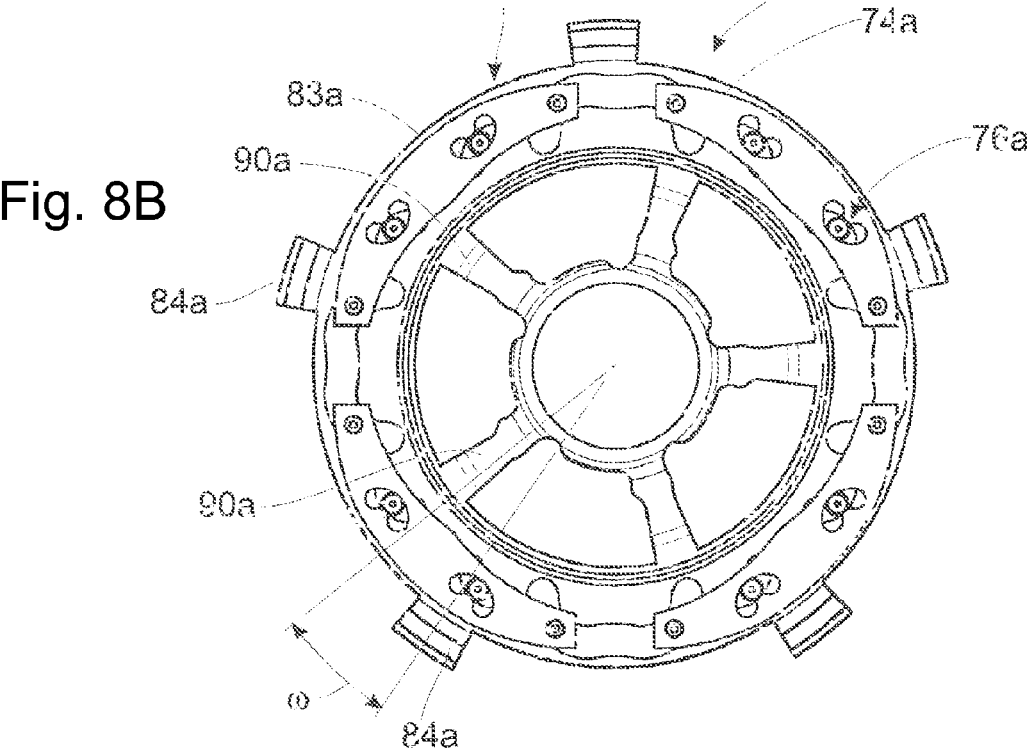
FIG. 8B is an axial view of a deflection mass pendulum arrangement for the vibration damping arrangement of the hydrodynamic torque converter from FIG. 4.

A further modification is shown in FIGS. 8A and B. FIG. 8A shows the torsional damper arrangement 34a with five first damper element units 56a and five second damper element units 68a just as is also shown in the embodiment form of FIG. 6A. A deflection mass pendulum arrangement 36a with a total of four circumferentially successive deflection masses 74a can be seen in FIG. 8B associated with this torsional damper arrangement 34a. Accordingly, the ratio of the quantity of first damper element units 56a and second damper element units 68a, respectively, to the quantity of deflection masses 74a is 1.25 in this case.

In contrast to the embodiment example in FIGS. 5A and B, the circumferential supporting region 84a and web region 90a in the embodiment example of FIGS. 8A and B have an angular offset with respect to one another. In other words, the web-shaped web region 90a and the circumferential supporting region 84a and the center lines thereof, shown in dashes, form an angle ω. Angle ω can lie, for example, within a value range having a starting value and/or ending value of 0°, 1°, 4°, 5°, 8° and/or 10°. A stress situation or a stress curve in the disk-shaped structural component part 83a, or so-called hub disk, changes as a result of the angular offset between the web for the radially outwardly located damper element arrangement 54a relative to the web 90a for the radially inwardly located damper element arrangement 66a. For some angles, for example, small angles, possibly 1°, an optimum stress can result in some embodiment examples. Accordingly, in some embodiment examples, a torque can be introduced from the circumferential supporting region 84a, also referred to as outer web, directly radially inwardly to the web region 90a.

FIGS. 5A to 8B show that there is a variability as regards the quantities and ratio of quantities of the damper element units on the one hand and deflection masses on the other hand that allows the vibration behavior of the torsional damper arrangement 34 on the one hand and the vibration behavior of the deflection mass pendulum arrangement 36a on the other hand to be adjusted in an optimal manner to existing requirements. Particularly when implementing an integration of the deflection mass pendulum arrangement 36a in the torsional damper arrangement 34a, i.e., for example, when a torque transmission element of the torsional damper arrangement 34a provides the deflection mass carrier 70a or a portion thereof, a 1:1 division as shown in FIGS. 5 and 6 is favorable in some embodiment examples because, in spite of this merging of functions, a very stable configuration of the torque-transmitting structural component of the torsional damper arrangement 34a which simultaneously also assumes a function in the region of the deflection mass pendulum arrangement 36a can be provided.

It should be noted that, of course, all further configuration parameters described above referring to FIG. 1 can be implemented individually or in combination in the constructional variants shown in FIGS. 4 to 8B.

Figure 9:
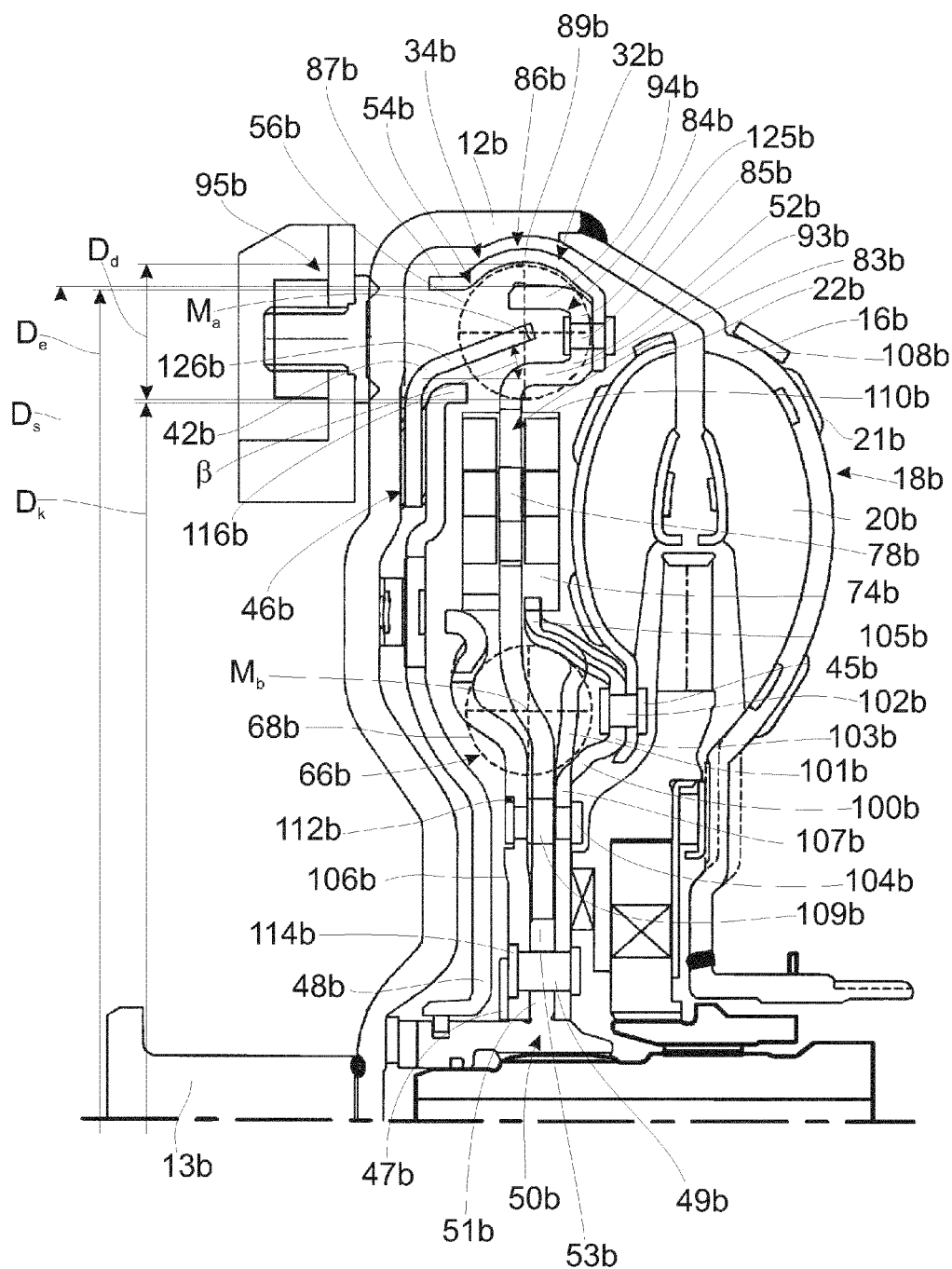
FIG. 9 is a schematic depiction of a fragmentary longitudinal section through a hydrodynamic torque converter with a vibration damping arrangement according to an embodiment example.

Referring to FIGS. 9A and B, an embodiment example of a hydrodynamic coupling device, again in the form of a hydrodynamic torque converter or vibration damping arrangement contained therein, will be described in the following. Here also, components corresponding to the components described above with respect to construction or function are designated by the same reference numerals in which a "b" is appended or has been substituted. Since the basic construction of torque converter 10b corresponds to the preceding description, only some of the differences compared to the embodiment forms according to FIGS. 1 and 4 will be described in the following. Of course, all of the features described can be implemented individually or in combination in further embodiment examples which are not shown.

A balance weight 108b is associated with the housing shell 16b in the region of the impeller 18b. The balance weight 108b can be fastened to the housing shell 16b, for example, before or after assembly of the torque converter 10b, to improve true running.

In the embodiment example in FIGS. 9A and B, clutch piston 48b, while comparable in size, has a larger diameter $D_k$ than clutch piston 48a in the embodiment example of FIG. 4. The clutch piston 48b or radial extension $D_k$ thereof is greater than a radius on which an outer edge 110b of the deflection masses 74b is located. In some embodiment examples, this can be the case for some operating states and in other embodiment examples this can be the case for all operating states. In the embodiment example of FIG. 4, the clutch piston 48a has a radius that is somewhat greater than a radius on which the guide path 78a for deflection masses 74a is located. In some embodiment examples, an actuation of the lockup clutch 46b or guiding of the primary side 42b formed as plate can be simplified and/or effected simultaneously by choosing the largest possible radius $D_k$ of the clutch piston 48b. In some embodiment examples, radius $D_k$ is limited by the construction of the radially outwardly located primary side 42b. In its radially outer region, primary side 42b has an engagement portion 126b which can be brought into operative communication, or is in operative communication, with the radially outwardly located damper element arrangement 54b. To this end, in some operating states the primary side 42b or engagement portion 126b projects by one end at least to a center point $M_a$ of the damper element unit 56b. The engagement portion 126b projects from a region of the primary side 42b that extends substantially parallel to the radial direction and extends in direction of the damper element arrangement 54b. In so doing, the engagement portion 126b forms an angle β with the axial direction, the amount of which can be between 0° and 89°, for example, between 15° and 50°. Accordingly, in some embodiment examples the clutch piston 48b can have a radial extension which is as large as possible when, as in the embodiment example in FIGS. 9A and B, it extends to a radial height at which the engagement portion 126b limits a radial installation space for the clutch piston 48b.

Clutch piston 48b has at its radially outwardly located end an end portion 116b which extends substantially in an axial direction. In this way, a stiffness of the clutch piston 48b could possibly be increased. In some embodiment examples, the clutch piston 48b can exert an emergency limit function for the primary side 42b in radially inward direction. Thus if required, the primary side 42b could be prevented from moving or deforming too far radially inward in some operating states.

In extreme operating states, the damper element arrangement 54b with the supporting structural component part 86b and the disk-shaped structural component part 83b can move in axial direction relative to the plate or primary side 42b. Owing to large clearance or long tolerance chains, it could then possibly happen that the free end structure 87b of the supporting structural component part 86b, which can also be referred to as collar of the holding plate, touches the housing 12b. This is undesirable because the supporting structural component part 86b can have the full differential speed of the engine and transmission relative to the housing 12b when the lockup clutch 46b, which can also be referred to as converter clutch, is open. This can possibly lead to high wear and/or chipping. In order to reliably enhance operating safety even in unfavorable operating states, the plate forming the radially outwardly located primary side 42*b* is shaped or formed in such a way in the embodiment example of FIGS. 9A and B that it can run against or touch the radially outwardly located damper element arrangement 54*b* in axial direction before the secondary side 52*b* or structural components thereof can touch the housing 12*b*. For this purpose, the radially outwardly located primary side 42*b* can touch the circumferential supporting region 84*b*, for example, at portion 125*b*, in some operating states.

Wear can at least be minimized in that the damper element arrangement 54*b*, which can also be referred to as spring set, stops at, or is supported by, the first or radially outwardly located primary side 42*b* in axial direction before contact occurs between housing 12*b* and secondary side 52*b*. This can be made possible in that, for one, only the angular movement of the damper element arrangement 54*b* and not the full differential speed occurs at a touching point or contact point between the primary side 42*b* and the spring set or circumferential supporting region 84*b*. Further, the primary side 42*b* can be constructed in such a way, e.g., through selection of material and/or machining of material, that wear is additionally reduced. To this end, a hardening process such as induction hardening or case hardening can be applied in some cases.

In contrast to some embodiment examples in which axial contact between the secondary side or damper element units and the primary side is prevented, a decoupling behavior can be improved by permitting axial contact between the radially outwardly located primary side 42*b* and secondary side 52*b*. This may possibly be the case because in other solutions of this type the damper element units or springs can in some cases have a considerably reduced diameter or constructional size, which can have worse results for decoupling behavior.

In other words, an axial guiding of the radially outwardly located damper element arrangement 54*b* through the primary side 42*b* is made possible in some embodiment examples. The primary side 42*b*, or plate, can possibly be centered through the damper element arrangement 54*b*, which can also be referred to as spring set.

Cover disk element 106*b* has a recess 112*b*. The recess 112*b* is formed to receive in its entirety the connection element 104*b* in axial direction or a head of the connection element 104*b* along the extension thereof in an axial direction. In this way, an installation space can possibly be reduced in axial direction. Further, the clutch piston 48*b* which is formed parallel to the cover disk element 106*b* in radial direction up to a radial height at which the connection element 104*b* is located could also possibly be prevented from running against the head of the connection element 104*b*. Similarly, the connection means 49*b* are also received in a recess 114*b* in cover disk element 106*b*.

Further contributing to a reduction in axial installation space, protective element 47*b* is also formed so as to be smaller axially than protective element 47*a*. To this end, protective element 47*b* is disk-shaped only and is formed without the extensions in axial direction.

Cover disk element 100*b* is constructed in a manner substantially analogous to cover disk element 100*a*, but differs from the latter with respect to the shape of the contact area 105*b*. The contact area 105*b* of cover disk element 100*b* extends to an axial height comparable to the center point $M_b$ of the damper element unit 68*b* substantially parallel to a radial direction. The axially comparable height can possibly be at a distance in axial direction from the center point $M_b$ corresponding to the areas described for radially comparable heights.

FIGS. 10A and 10B show a cover disk element which can be associated with a radially inner damper element arrangement, for example, on a side facing the turbine. Here, components corresponding to the components described above with respect to construction and function are designated by the same reference numerals in which a "c" is appended or has been substituted.

Cover disk element 100*c* serves to receive the damper element unit 68*c*, shown in dashes, and forms a portion of a damper element channel for receiving the damper element unit 68*c*. The side designated by 127*c* is an outer side. This outer side can face the turbine.

In cover disk element 100*c*, the damper element unit control piece 101*c* and limiting region 103*c* are connected only at a radially inner contact area 107*c*. Radially inwardly of the contact area 107*c*, the cover disk element is formed in a disk-shaped manner with a substantially identical axial extension.

The damper element unit control piece 101*c*, which can also be constructed as spring control piece, has a free end 120*c*. The free end 120*c* is not in contact with any areas of the cover disk element 100*c* other than the damper element unit control piece 101*c*, and the cover disk element 100*c* does not touch the limiting region 103*c*. In other words, cover disk element 100*c* can also be designated as an open cover plate.

The limiting region 103*c* has a curvature extending in direction of the outer side 127*c* such that a portion of the damper element channel is formed on the side remote of the outer side 127. In some cases, the damper element channel can be constructed as spring channel for receiving springs or spring elements. The damper element channel can be supplemented by a further cover disk element, not shown, on a side remote of the outer side 127.

The curvature of the limiting region 103*c* is shaped substantially corresponding to the shape of the damper element unit 68*c* at least in the area by which it contacts the limiting region 103*c*. A radially outer region 123*c* of the limiting region 103*c* is formed substantially parallel to a radial direction. The radially outer region 123*c* extends radially outside of the damper element unit 68*c* or damper element channel in which it can be received. A side of the radially outer region 123*c* remote of the outer side 127 is located at an axial height of a center of the damper element channel. In other words, the center point $M_b$ of the damper element unit 68*c* can lie at a height axially comparable to the outer side 127. In some further embodiment examples, not shown, the outwardly located region 123*c* can be arranged at a different axial height of the damper element channel.

In some embodiment examples, the cover disk element 100*c* is produced as a stamped part. For example, a stamp die side can face in arrow direction P.

As a result of the fact that the damper element unit control piece 101*c*, which can also be constructed as a spring control piece in some embodiment examples, is not connected radially outwardly as are the cover disk elements in the other embodiment examples, cover disk element 100*c* can expand freely in radial direction, for example, at high speeds, without being held radially inwardly at the damper element unit control piece 101*c*. High stresses or large stress peaks in the cover disk element 100*c* can be prevented or at least reduced in this way.

As is shown in FIG. 10B, the damper element unit control piece 101*c* is formed in that C-shaped cutouts 121*c* are introduced into the cover disk element 100c. The cutouts 121c have a region which extends substantially in a circumferential direction of the cover disk element 100c. The radially inner boundary of this region forms the free end 120c. Portions of the C-shaped cutout 121c extending radially inward adjoin the two circumferentially opposed ends of the region along a radius $R_3$ and $R_1$, respectively. The radially inner boundary of this region is contact area 107c. The C-shaped cutout 121c has a radius $R_2$ in the area along contact areas 107c in each instance. In some embodiment examples, an advantageous stress curve can be achieved in the cover disk element 100c through the radii.

Cover disk element 100c comprises four cutouts 121c and four damper element unit control pieces 101c, respectively. The latter are arranged at an angular distance of 90° relative to one another in each instance. For cover disk elements intended for a different quantity of damper element units, a different, larger or smaller, quantity of damper element unit control pieces can also be formed.

Further, a plurality of apertures 117c are introduced in the cover disk element 100c approximately at a radially comparable height on which the free end 120c of the damper element unit control piece 101 is also located. Four apertures 117c are provided in each instance in circumferential direction between two damper element unit control pieces 101c, respectively. These apertures 117c serve, for example, to receive a connection structure, for example, for connecting the turbine 22a or 22b to the cover disk element 100c. In some further embodiment examples, not shown, a different quantity of such apertures, for example, two, three, five or more, can be provided.

Cover disk element 100c has twelve apertures 119c in an area located radially inwardly of the contact area 107c. These apertures 119c serve to receive the connection elements for fastening to the output hub. In some further embodiment examples, not shown, a different quantity of apertures can also be provided.

Further, as can be seen in view B, four apertures 118c are introduced in cover disk element 100c. These apertures 118c serve to receive a connection element, for example, for fastening to the disk-shaped structural component part 83a or 83b. In some further embodiment examples, not shown, the quantity of apertures 118c can be greater or smaller. Aperture 118c is arranged so as to be radially aligned with an aperture 117c which is located adjacent to the damper element unit control piece 101c.

The embodiment examples and individual features thereof disclosed in the preceding description, appended claims and accompanying drawings can be significant and can be implemented individually as well as in any combination for realizing an embodiment example in its various refinements.

The invention claimed is:

1. A vibration damping arrangement for the drivetrain of a vehicle comprising:
   a torsional damper arrangement (34; 34a) comprising a first torsional vibration damper (38; 38a) with a first primary side (42; 42a) couplable to a drive member for transmitting torque and with a first secondary side (52; 52a) rotatable around an axis of rotation (A) with respect to the first primary side (42; 42a) against the return action of a first radially outwardly located damper element arrangement (54; 54a), and a second torsional vibration damper (40; 40a) with a second primary side (60; 60a) connected to the first secondary side (52; 52a) and with a second secondary side (62; 62a) rotatable around the axis of rotation (A) with respect to the second primary side (60; 60a) against the return action of a second radially inwardly located damper element arrangement (66; 66a) and couplable to an output member (50; 50a) for transmitting torque;
   a deflection mass pendulum arrangement (36; 36a) comprising a deflection mass carrier (70; 70a) and a deflection mass arrangement (75; 75a) with at least one deflection mass (74; 74a) supported at the deflection mass carrier (70; 70a) such that the deflection mass can deflect out of a neutral relative position;
   wherein the first damper element arrangement (54; 54a) comprises a plurality of circumferentially successive first damper element units (56; 56a) and/or the second damper element arrangement (66; 66a) comprises a plurality of circumferentially successive second damper element units (68; 68a); and
   a supporting structural component part (86a, 86b) which serves as a radially outwardly located stop for at least one of the plurality of damper element units (56a, 56b) of the radially outwardly located damper element arrangement (54a, 54b); and wherein the supporting structural component part (86a) comprises a free end structure (87a, 87b) which extends farther in an axial direction than the damper element unit (56a, 56b),
   wherein the radially outwardly located damper element arrangement (54a, 54b) is arranged at a disk-shaped structural component part (83a, 83b), and wherein an inner diameter of the supporting structural component part (86a, 86b) is smaller at one end (87) of the supporting structural component part (86a, 86b) than an outer diameter of the disk-shaped structural component part (83a, 83b).

2. The vibration damping arrangement according to claim 1, wherein a radius in a value range between 2 mm and 20mm is formed between the free end structure (87a) and a contact area (89a, 89b) of the supporting structural component part (86a, 86b).

3. The vibration damping arrangement according to claim 1, wherein the free end structure (87a, 87b) is formed integral with the supporting structural component part (86a, 86b) as a sheet metal part.

4. The vibration damping arrangement according to claim 1, wherein the free end structure (87a, 87b) extends parallel to an axial direction.

5. The vibration damping arrangement according to claim 1:
   wherein the radially outwardly located damper element arrangement (54a, 54b) is arranged at a disk-shaped structural component part (83a, 83b), and wherein the supporting structural component part (86a, 86b) is connected to the disk-shaped structural component part (83a, 83b) via a connection structure (85a, 85b) which is located at a radial height at about a center point of the damper element unit (56a, 56b).

6. The vibration damping arrangement according to claim 1:
   additionally comprising a housing shell (12b) and a turbine (22a, 22b); and
   wherein the first primary side (42b) and first secondary side (52b) are configured to contact one another in axial direction in an operating state in order to prevent the first secondary side (52b) from touching the housing shell (12b).

* * * * *